United States Patent
Cutler et al.

(10) Patent No.: US 7,695,580 B2
(45) Date of Patent: Apr. 13, 2010

(54) METHOD OF FORMING A CERAMIC TO CERAMIC JOINT

(75) Inventors: Raymond Ashton Cutler, Bountiful, UT (US); Kent Neal Hutchings, Salt Lake City, UT (US); Brian Paul Kleinlein, Salt Lake City, UT (US); Michael Francis Carolan, Allentown, PA (US)

(73) Assignees: Air Products and Chemicals, Inc., Allentown, PA (US); Ceramatec, Inc., Salt Lake City, UT (US)

( * ) Notice: Subject to any disclaimer, the term of this patent is extended or adjusted under 35 U.S.C. 154(b) by 686 days.

(21) Appl. No.: 11/332,995

(22) Filed: Jan. 17, 2006

(65) Prior Publication Data

US 2007/0166570 A1    Jul. 19, 2007

(51) Int. Cl.
    C03B 29/00    (2006.01)
(52) U.S. Cl. .................................. 156/89.11
(58) Field of Classification Search .............. 156/89.11
    See application file for complete search history.

(56) References Cited

U.S. PATENT DOCUMENTS

| | | | |
|---|---|---|---|
| 3,239,323 A | | 3/1966 | Folweiler |
| 3,782,989 A | | 1/1974 | Mansur |
| 4,347,089 A | * | 8/1982 | Loehman ................ 156/89.27 |
| 5,954,900 A | * | 9/1999 | Hegner et al. ............ 156/89.11 |
| 6,165,301 A | * | 12/2000 | Henager et al. .......... 156/89.11 |
| 7,011,898 B2 | * | 3/2006 | Butt et al. ..................... 428/701 |
| 7,094,301 B2 | * | 8/2006 | Butt et al. ................. 156/89.11 |
| 2003/0102071 A1 | * | 6/2003 | Mako et al. .............. 156/89.11 |
| 2004/0129370 A1 | * | 7/2004 | Taylor et al. ............. 156/89.11 |
| 2004/0182306 A1 | | 9/2004 | Butt et al. |
| 2004/0185236 A1 | | 9/2004 | Butt et al. |
| 2006/0110624 A1 | * | 5/2006 | Hattori et al. ............... 428/698 |

FOREIGN PATENT DOCUMENTS

DE    10135087 A1    2/2003

(Continued)

OTHER PUBLICATIONS

Peteves, S. D., et al., "The reactive route to ceramic joining: fabrication, interfacial chemistry and joint properties", Acta mater., vol. 46, No. 7, (1998), pp. 2407-2414.

(Continued)

*Primary Examiner*—Philip C Tucker
*Assistant Examiner*—Michael N Orlando
(74) *Attorney, Agent, or Firm*—Jiyun Xu

(57) ABSTRACT

A method of joining at least two sintered bodies to form a composite structure, includes: providing a joint material between joining surfaces of first and second sintered bodies; applying pressure from 1 kP to less than 5 MPa to provide an assembly; heating the assembly to a conforming temperature sufficient to allow the joint material to conform to the joining surfaces; and further heating the assembly to a joining temperature below a minimum sintering temperature of the first and second sintered bodies. The joint material includes organic component(s) and ceramic particles. The ceramic particles constitute 40-75 vol. % of the joint material, and include at least one element of the first and/or second sintered bodies. Composite structures produced by the method are also disclosed.

16 Claims, 12 Drawing Sheets

FOREIGN PATENT DOCUMENTS

| | | | |
|---|---|---|---|
| JP | 1-103965 | * | 4/1989 |
| JP | 1-103965 A | | 4/1989 |
| JP | 3-257076 | * | 11/1991 |
| JP | 6-63114 | * | 3/1994 |
| JP | 8-2977 | * | 1/1996 |
| JP | 8-124735 | * | 5/1996 |
| SU | 1038324 | | 8/1983 |

OTHER PUBLICATIONS

Lino, Y., "Partial transient liquid-phase metals layer technique of ceramic metal bonding", J. of Mat. Sci. Lett. 10, (1991), pp. 104-106.

Serkowski, S., "Application of ceramic-metal eutectics for solid-state bonding between ceramics," Int. Symp. Ceram. Mater. Compon. Engines, 4$^{th}$ (Roger Carlsson et al. eds.) (1992), pp. 348-355.

Neuhauser, M., et al., "Fugen von Technischen Keramiken mit Keramik-Grunfolien," Ber. DGK, vol. 72, No. 1-2, (1995), pp. 17-20.

Seifert, D., et al., "Verbind poroser mit dichtgesinterter Al2O3-Keramik durch Fugen mit keramischen Folien," Ber. DGK, vol. 73, No. 10 (1996), pp. 585-589.

Chaim, R., "Joining of alumina ceramics using nanocrystalline tape cast interlayer," J. of Materials Research, 15, (2000), pp. 1724-1728.

Zhou, Y., et al., "Modelling of transient liquid phase bonding", Int. Mat. Rev., vol. 40, No. 5 (1995), p. 181.

Tuah-Poku, I., et al., "Study of Transient Liquid Phase Bonding, etc.", Metallurgical Transactions A, vol. 19A, Mar. 1988, p. 675.

Rabin, et al., "Reaction processing and properties of SiC-to-SiC joints," Material. Res. Soc. Symp. Proc. 314, (1993), 197-203, Material Research Society, Pittsburgh.

* cited by examiner

METHOD OF FORMING A CERAMIC TO CERAMIC JOINT

STATEMENT REGARDING FEDERALLY SPONSORED RESEARCH OR DEVELOPMENT

This invention was made with Government support under DOE Cooperative Agreement No. DE-FC26-98FT40343 between Air Products and Chemicals, Inc., and the United States Department of Energy. The Government has certain rights to this invention

BACKGROUND OF THE INVENTION

The present invention relates to a method of forming a joint at an interface between two sintered bodies comprising metallic oxides of specific crystal structure.

When employing sintered bodies in a device, such as an oxygen separation device, it is often mandatory to join the same securely or even to provide a gas-tight joint, said joint being required to withstand operation conditions of the device. Typical sintered bodies in the above devices are an ion transport membrane (an electrolyte), an interconnect, a support, ceramic tubes, seals and conduits, etc. Such sintered bodies are typically joined tube-to-tube, tube-to-flat-plate and flat-plate to flat-plate, respectively.

Any joint is likely to form the weakest point of the entire device. Weak points are critical in cases where the device is subjected to severe operation conditions such as high temperature, high pressure differences or highly oxidizing or reducing environments which are tolerated by the sintered bodies themselves. To provide a commercially viable device, the joint is thus likewise required to maintain mechanical integrity, compatibility with the sintered bodies and gas-tightness even when subjected to the operating conditions. Accordingly an ideal joint would possess comparable chemical and mechanical properties as the materials to be joined, especially comparable thermal cycling stability.

Up to now, joints between sintered bodies have been formed by using metallic brazes, nanocrystalline oxides, oxide-metal eutectics, glasses and ceramic-glass composites. See, e.g., S. D. Peteves et al., "The reactive route to ceramic joining: fabrication, interfacial chemistry and joint properties", Acta mater. Vol. 46, No. 7, (1998), pp. 2407-2414; Y. Iino, "Partial transient liquid-phase metals layer technique of ceramic metal bonding", J. of Mat. Sci. Lett. 10, (1991), pp. 104-106; S. Serkowski, "Application of ceramic-metal eutectics for solid-state bonding between ceramics," Int. Symp. Ceram. Mater. Compon. Engines, 4$^{th}$ (Roger Carlsson et al. eds.) (1992) pp. 348-355; M. Neuhauser et al."Fugen von Technischen Keramiken mit Keramik-Grunfolien," Ber. DGK, Vol. 72, No. 1-2, (1995) pp. 17-20; D. Seifert et al. "Verbind poroser mit dichtgesinterter $Al_2O_3$-Keramik durch Fugen mit keramischen Folien," Ber. DGK, Vol. 73 No. 10 (1996) 585-589; and R. Chaim et al. "Joining of alumina ceramics using nanocrystalline tape cast interlayer," J. of Materials Research, 15, (2000) pp.1724-1728.

Joining of sintered bodies using ceramic-metal eutectics has the disadvantage of requiring the use of a metal. Many metals oxidize in air at high temperatures and therefore require the use of special reducing atmospheres to prevent the formation of a metal oxide. The sintered bodies to be joined may not be stable in these reducing atmospheres, which would result in decomposition of the sintered bodies.

Joining of sintered bodies using nanocrystalline interlayers has the disadvantage of requiring very high pressures that could damage the parts to be joined due to creep or even fracture.

The use of brazes, i.e., metallic materials, or glasses, i.e., solid solutions of multicomponent metallic oxides, has the disadvantage of leaving behind an interfacial phase of the joint material with properties differing from, and in most cases inferior to, those of the materials being joined. For example, brazes leave behind a ductile metal, which at elevated temperatures can creep, be incompatible with the surrounding ceramic materials, or oxidize.

Similarly, glass joints may have significantly different thermal expansion coefficients compared with surrounding multicomponent metallic oxides having perovskitic or fluoritic structure, resulting in undesirable residual stresses following temperature changes. Glass joints will further soften and flow at temperatures above their respective glass transition temperature. Finally, glass joints can be chemically incompatible with a sintered body of perovskitic or fluoritic structure at elevated temperatures. In any case, due to the remaining material, the joint will inevitably be visually or microscopically detectable, its properties being determined by the material of the joint itself, not the bodies to be joined.

Rabin et al., "Reaction processing and properties of SiC-to-SiC joints." Material. Res. Soc. Symp. Proc. 314, (1993), 197-203, Material Research Society, Pittsburgh, discloses another method of forming a joint, wherein SiC components can be joined by using a mixture of Si and C powders. The document is silent on joining oxides in general, and especially on joining of multicomponent metallic oxides having fluoritic or perovskitic structure.

Seifert et al. discloses a method to join alumina ceramics using ceramic joining foils of alumina-titania-calcia-magnesia. Other joining foils of alumina-titania-calcia-magnesia-silica and alumina-titania-manganese oxide-iron oxide-silica are also described. The joining temperature was greater than 100° C. lower than the sintering temperature of the alumina ceramics to be joined. These joining compositions formed a liquid phase upon heating to the joining temperature. After joining, the joint retained the composition of the joining foils and was compositionally different than the alumina bodies that were joined. This reference states that the joining compositions to be used are highly specific to the ceramics to be joined. This reference is silent on how to join multicomponent metallic oxides. It is specifically silent on how to join perovskitic multicomponent oxides.

Another method to join alumina ceramics, which is disclosed in Neuhauser et al., requires the use of ceramic foils made from a mixture of alumina, silica and other oxides. The presence of silica is undesirable since silica can be chemically or mechanically incompatible with the ceramics to be joined. In addition, this reference is also silent on how to join multi-component metallic oxides.

A third method to join alumina parts using a $(Al,Cr)_2O_3$—Cr eutectic joining mixture is disclosed in Serkowski. To obtain the joint, special gas atmospheres to produce extremely low oxygen partial pressures were required to allow the joining mixture to melt. The requirement of these special gas atmospheres limits the ceramics with which the eutectic mixtures can be used. Many ceramics will not be stable under the low oxygen partial pressure conditions needed for the eutectics to melt. Also the eutectic joining mixtures will result in the joint material being chemically and mechanically dissimilar to the bodies to be joined. This will have a negative effect of the stability and integrity of the joint. In addition, this reference is silent on joining multicomponent metallic oxides.

A fourth method to join alumina is disclosed in Chaim et al. This method requires hot pressing the alumina parts to be joined under uniaxial pressures of 55-80 MPa at 1200-1300° C. This method has the alleged advantage that the joint material is chemically and mechanically identical to the parts to be joined. However, the high pressures necessary to produce the joint are undesirable since the high pressures can lead to fracture or creep of the ceramic parts to be joined. In addition, this reference is also silent on how to join multicomponent metallic oxides.

Another type of bonding has been developed which is the so-called transient liquid phase bonding (TLP). See, e.g., Y. Zou et al., "Modelling of transient liquid phase bonding", Int. Mat. Rev. Vol. 40, No. 5, (1995), p.181, and I. Tuah-Poku et al., "Study of the Transient Liquid Phase Bonding, etc.", Metallurgical Transactions A Vol. 19A, March 1988, p. 675. This process relies on the transient formation of a liquid phase depending on solute diffusion.

In many applications it is acceptable and oftentimes desirable to use a liquid phase or a transient liquid phase in order to join ceramic material. For example, see our prior U.S. Patent Application Publication Nos. 2004/0185236 A1 and 2004/0182306 A1 to Butt et al., which disclose liquid phase or transient liquid phase joining at below the sintering temperature. Both applications teach the use of low pressure and low joining pressures. They also teach the concept of high packing density and the ability to conform to the joining surfaces. These applications do not disclose or suggest that it is possible to obtain a joined material having uniform mechanical and thermal properties throughout the material, wherein the joining process is conducted without the use of a liquid phase.

Moreover, for some ceramics, the transient liquid phase produces undesirable second phases in the joint or in the adjacent ceramics to be joined. These second phases can result in joints with inferior mechanical properties. For example, when using a material with high chemical expansivity the use of a liquid phase may result in chemical gradients, which create stress upon thermal cycling.

One example where the transient liquid phase approach produces joints with inferior mechanical properties is the joining of LSCO ($La_{1-x}Sr_xCoO_{3-d}$) ceramics using a CuO—$Ca_2CuO_3$ eutectic joint material that produces a liquid phase containing Cu. After joining, a region with a high concentration of a cobalt oxide second phase, for example, has been observed when using Cu as a liquid forming additive. The phase change between CoO and $Co_3O_4$ in the second phase during temperature cycling from the joining temperature to room temperature introduces a tensile stress in the surrounding LSCO perovskite matrix and leads to cracking of the matrix. Providing a joining composition chemically identical to the material to be joined would solve this problem.

For other ceramics it is not possible to identify a transient liquid phase composition that produces a joint material that is chemically and mechanically compatible with the ceramics to be joined. The joining temperature should not exceed the sintering temperature of the material in order to limit grain growth. In many instances it is also desirable to join below the sintering temperature in order to limit creep deformation of the component being joined.

Therefore, the ability to join without a transient liquid phase at low pressures and low temperatures relative to the sintering temperatures is highly desirable and would be an improvement in the art. Low temperatures are defined as a temperature at least 100° C. below the sintering temperature. The sintering temperature is defined as the temperature required to reach greater than 95% of theoretical density. Low pressures are defined as pressures at the seal of less than 5 MPa and preferably less than 2 MPa.

It is therefore desired to provide a method of forming a joint between a first sintered body comprising a first multicomponent metallic oxide having a crystal structure of the perovskitic or fluoritic type and a second sintered body comprising a second multicomponent metallic oxide having a crystal structure of the same type as the first multicomponent metallic oxide, which method allows for formation of a joint that is chemically and mechanically compatible with the first and second sintered bodies. It is further desired that the formation of the joint does not leave behind a distinguishable interfacial phase. It is still further desired that the method should further allow for forming a compatible, refractory interfacial phase or joint, especially a joint exhibiting comparable thermal cycling stability.

All references cited herein are incorporated herein by reference in their entireties.

BRIEF SUMMARY OF THE INVENTION

Accordingly, in a first aspect of the invention there is provided a method of joining at least two sintered bodies to form a composite structure, said method comprising: (a) providing a first sintered body comprising a first metallic oxide; (b) providing a second sintered body comprising a second metallic oxide; (c) providing a joint material between joining surfaces of the first sintered body and the second sintered body, wherein the joint material comprises at least one organic component and ceramic particles, wherein the ceramic particles: (i) constitute at least 40 vol. % and not more than 75 vol % of the joint material; and (ii) comprise at least one element contained in at least one of the first sintered body and the second sintered body; (d) applying a pressure to the joining surfaces of at least 1 kPa and less than 5 MPa to provide an assembly of the first sintered body, the second sintered body and the joint material; (e) heating the assembly to a conforming temperature sufficient to allow the joint material to conform to the joining surfaces; and (f) further heating the assembly to a joining temperature below a minimum sintering temperature of the first and second sintered bodies, whereby the at least two sintered bodies are joined by the joint material to form the composite structure.

In a second aspect of the invention there is provided a composite structure prepared by the method of the invention. The composite structure comprises: a first sintered body comprising a first metallic oxide; a second sintered body comprising a second metallic oxide; and a joint between the first sintered body and the second sintered body comprising at least one organic component and ceramic particles, wherein the ceramic particles: (i) constitute at least 40 vol. % and not more than 75 vol. % of the joint material; and (ii) comprise at least one element contained in at least one of the first sintered body and the second sintered body.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Figure 1:
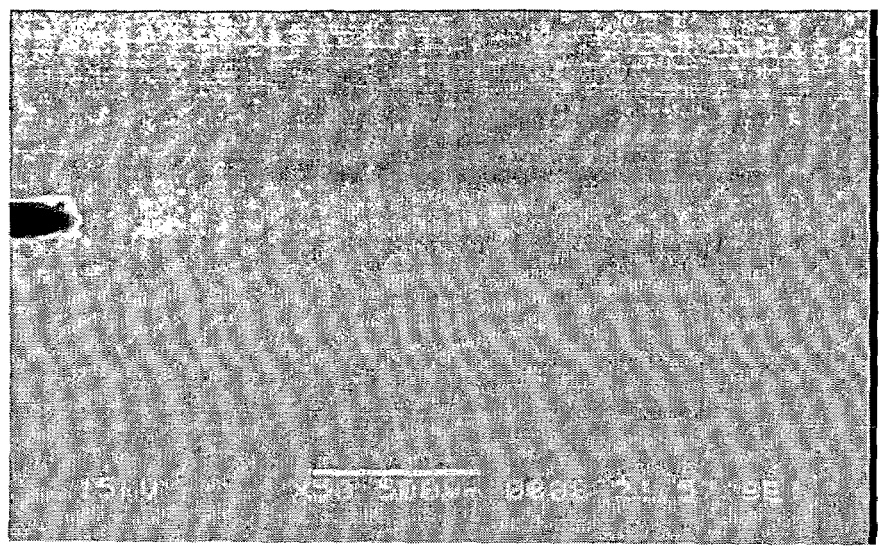
FIG. 1 is a scanning electron micrograph showing a polished cross-section of a joined region of Example 1 after heating to 1250° C. for four hours.

The present invention relates to a method of forming a joint between previously sintered ceramic bodies, so as to provide a substantially seamless (or monolithic) structure. The inventors have surprisingly found that it is possible to join sintered ceramic bodies using green ceramic joint material of the same composition as the sintered bodies using solid state sintering. A "ceramic joint material" (sometimes referred to as "joint material" or "joining material") is defined herein as a composite mixture of ceramic particle and organic components. The organic components can include, e.g., polymeric binders, plasticizers, dispersants and/or solvents. The term "green" denotes that the joint material is unsintered, and is not intended to limit in any manner the color of the joint material.

In a preferred embodiment, the green joint material comprises tightly-packed ceramic particles held together by a plasticized polymeric binder. The polymeric component of the green joint material allows the ceramic particles to rearrange under the application of pressure and temperature, conforming to the joining surfaces of the sintered ceramic bodies. Once the polymers are removed during joining, there remain only ceramic particles, which do not form a liquid phase at any point of the joining process. Typically, the binders are removed by heating the joint material in air, whereupon the binders decompose and diffuse out of the joint as vapor or combustion products. The ceramic joint material densities by solid state sintering under the application of load and pressure. Initially, the particles neck together and form a bond with the joining surfaces of the previously sintered ceramic. Once a continuous network of bonded ceramic particles is formed between the joining surfaces, the application of pressure is no longer required. Although pressure is advantageous in lowering the sintering temperature, it is only required in order to allow constrained sintering. Necking of particles and partial sintering, however, are adequate to form enough constraint so that sintering can proceed in the absence of applied pressure, if this is desired.

The joining of previously sintered ceramics is of immense importance when making complex devices which operate at high temperatures. While inorganic glasses and metallic brazes are often adequate for joining, they have limitations, including creep above their respective glass transition temperatures (for amorphous materials) or approaching their melting temperature (for metallic seals). A ceramic-to-ceramic joining process allows materials to be used at high temperatures with the joint having similar properties to other parts of the component. In another embodiment of the invention it is possible to make the joint stronger than the remainder of the ceramic by tailoring its properties so that the joint is in residual compression at low temperatures.

The present invention differs from diffusion bonding in that high pressure and flat surfaces are not required for bonding. The invention does not require the use of expensive raw materials, nanosized particles or the formation of a liquid phase.

Solid state sintering is a particularly preferred aspect of the inventive method and allows this simple method to be applied to a wide variety of sintered ceramics including oxides, nitrides, carbides, borides, as well as mixtures and solid solutions of these materials. The method of the invention can be applied to virtually any material that sinters without forming a liquid (or less preferably forms only an insubstantial amount of liquid).

When joining flat surfaces there is great flexibility in the joining process since constraint on the joint is easily achieved. The green joint material can therefore be formed with little polymer by processes such as dry pressing, isostatic pressing, roll compaction, gel casting, slip casting, centrifugal casting, extrusion or other methods known to the art, as well as by methods which require more polymeric material such as tape casting or injection molding. While methods which result in lower packing densities, such as screen or ink-jet printing, could also be used, it is desired to increase the packing density in the green state in order to limit z-direction shrinkage during firing.

Constraint is preferred during the initial stages of joining in order to allow bonding as solid state sintering progresses. Constraint is preferably applied as a pressure normal to the joining surfaces. It is also within the scope of the invention to apply pressure at an angle substantially normal to the joining surfaces, wherein "substantially normal" means within ±10 degrees of normal. The invention also encompasses the application of pressure from more than one direction. However, there is no need in this process for any constraint on the joint in the x-y direction since nearly all of the densification occurs in the z-direction.

The amount of pressure is preferably at least 1 kPa but less than 5 MPa, and more preferably less than 2 MPa. Too high a joining pressure can cause cracking in the green state prior to the necking of ceramic particles in the joint material as solid state sintering initiates. The green joint material is especially susceptible to cracking after the removal of the binder and prior to the onset of sintering. Excessively high pressures can damage the sintered bodies to be joined also, either by causing creep of those bodies or by breaking those bodies.

When joining surfaces with local or global out-of-flatness it is important to balance high green density with the ability of the green ceramic to conform to the surfaces to be bonded under the application of low pressure and low temperature (the temperature at which 90% by weight of the polymers are removed by processes such as wicking, capillary flow, volatilization, and/or decomposition). The application of pressure must remain until the ceramic joint has sufficient strength to apply constraint due to the stability of the previously sintered ceramic surrounding the joint. These requirements typically require a high volume of organic material, such that the green joint material contains 20-50 vol. % organic material.

While it is possible to allow the green joint material to conform at room temperature, this is not necessary since the application of temperature permits plastic flow of polymeric components of the joint material under stress. Creep of the polymer allows the surfaces of the green joint material to conform to the joining surfaces of the sintered bodies to be joined. Too much elongation, of course, results in rupture of the green tape. Cracks can therefore originate during low-temperature plastic flow and are difficult to detect until sintering allows the cracks to open. Therefore, the flatness of the surfaces to be joined and the elongation at rupture of the joint material must be matched such that the joint material does not crack during the thermal treatment to allow the joint material to conform to the surfaces to be joined. Any cracks originating from rupture during plastic flow are easy to distinguish from cooling cracks not only due to their crack opening displacement but also because of the thermal etching of the surfaces compared to cracking that occurs upon cooling. Cracking can also occur at the onset of sintering, if constraint is not present, since only the joint material densities and stresses can only be relaxed through diffusion and creep. During the onset of sintering, the creep rate is low.

Means for forming the green joint material are not particularly limited. Tape casting is the preferred method, since it is simple and easy to tailor the properties of the green tape by choosing the appropriate binder and plasticizer in combination with the selection of the ceramic particle size distribution and solids loading.

In order to minimize z-direction shrinkage and to enhance densification of the joint material, it is desirable to achieve a high packing density in the green ceramic joint material. One method of obtaining high packing density is to attain a high solid fraction of ceramic particles in the green joint. Processing methods such as tape casting, uniaxial pressing, isostatic pressing, extrusion, roll compaction, gel casting, slip casting, centrifugal casting, and injection molding are common methods for obtaining high packing densities of the ceramic particles. Packing, however, must be tempered with sintering activity. It is not uncommon to use bimodal or trimodal size distributions, where particles are chosen such that the smaller particles fit into the interstices of the larger particles. High packing density is only desirable if it allows for high sinterability. Since larger particles will dictate the sintering rate, higher packing density is not desired if it hinders the sintering activity. Similarly, while nanoparticles enhance sinterability, a joint material made entirely of nanoparticles typically does not allow high packing density due to their high surface area. Therefore an optimum amount of sintering activity is desired.

The joint material should have a green density of at least 40% of theoretical after binder removal and preferably above 50% of theoretical, so that the maximum z-direction shrinkage is less than 60% of the initial gasket thickness. With proper packing it is possible to get green densities above 60% of theoretical, thereby limiting the z-direction shrinkage to less than 40%.

The particle size distribution and surface area of the ceramic particles in the green seal are dictated by the desired joining conditions. In certain embodiments, surface areas can be as low as 2 m$^2$/g and particle size distributions can range from 0.1 µm to 3 µm, with a d$_{50}$ of 1 µm. Particles having surface areas as high as 25 m$^2$/g can be employed in the inventive method, but small particles limit plastic flow in the green state and result in poor particle packing. The preferred surface area ranges from 2 to 10 m$^2$/g and is more preferably from 3 to 8 m$^2$/g. The mean particle size is preferably from 0.1 to 1.0 µm.

A variety of aqueous and nonaqueous solvent systems can be used in the green joint material based on the selection of binder and plasticizer. Solids content, once the solvent has been fully evaporated, should preferably range from 40 to 75 vol. % and more preferably from 50 to 65 vol. % for joining nonplanar surfaces. Solids content is defined as the volume fraction of ceramic particle in the joint material after the evaporation of the solvent. When joining surfaces, the binder should be plasticized such that it is above its glass transition temperature at room temperature. The choice of plasticizers will depend on the binder choice. For example, butyl benzyl phthalate will plasticize polyvinyl butyral binder.

Suitable binders include but are not limited to polyvinyl butyral, polypropylene carbonate, polyvinyl alcohol, polyvinyl chloride, polyacrylate esters, polymethyl methacrylate, poly isobutylene, polyurethane, methyl cellulose, and latex.

Suitable plasticizers include but are not limited to butyl benzyl phthalate, dimethyl phthalate, polyethylene glycol, polyalkylene glycol, triethylene glycol, glycerol, butyl stearate, propylene carbonate, and butyl stearate.

The ultimate tensile strength of the joining tape is preferably above 1 MPa and more preferably above 2 MPa, with a yield strength, which is preferably at least 0.1 MPa and more preferably above 0.2 MPa. The percent elongation of the green tape under tension preferably exceeds 5% when joining unground surfaces and more preferably is in excess of 10%.

The sintered bodies to be joined are preferably ceramic, and more preferably comprise multicomponent metallic oxides (i.e., oxides of at least two metals). Suitable materials for the sintered bodies include but are not limited to $La_{1-x}Sr_xCo_yO_{3-d}$ where $1 > x > 0$, $1.1 > y > 1$; $(La_{1-x}Ca_x)_yFeO_{3-d}$ where $1 > x > 0.5$, $1.1 \geqq y > 1$ and d makes the compound charge neutral; other perovskite compositions; partially and fully stabilized zirconia; rare or alkaline earth doped ceria; mullite; magnesia; alumina; alumina-zirconia; barium titanate; and a wide variety of other ceramic compositions including, but not limited to, beta and beta" alumina, nasicon, aluminium titanate, cordierite, silicon carbide, titanium carbide, tungsten carbide, titanium diboride, aluminium nitride and silicon nitride.

The present invention is especially well suited to joining ceramics with perovskitic or fluoritic crystal structures. Perovskitic structures include as substructures true perovskites that incorporate a three-dimensional cubic array of octahedra, as well as structures that incorporate a perovskite-like layer or layers, i.e., a two-dimensional array of octahedra arranged in a two-dimensional square array. The octahedra consist of small diameter metal ions coordinated by six anions sites. These octahedra are charge stabilized by larger diameter metal ions. Non-limiting examples of perovskitic structures include cubic perovskites, brownmillerites, Aurivillius phases and the like. Aurivillius phases, sometimes called lamellar perovskites, consist of layers of perovskite wherein the larger diameter metal cations have, in part or in total, been replaced by layers of another oxide, commonly $(Bi_2O_2)^{2+}$. Brownmillerites are perovskites that have one-sixth of the oxygen ions missing with the resulting oxygen ion vacancies ordered into continuous lines within the crystal. An example is $CaFeO_{2.5}$.

Fluoritic crystal structures include true fluorites. Fluorites are characterized by cation coordination numbers of 8 and anion coordination numbers of 4. The cations are arranged in a cubic close packed array in which the anions occupy tetrahedral sites between the cations. Examples of fluorites include yttria-stabilized zirconia, stabilized bismuth oxide, ceria and doped ceria.

The surfaces to be joined should be as flat as possible, with ground or creep-flattened surfaces preferred over unground or as-fired surfaces. The maximum out-of-flatness of the sintered parts being joined should be less than 500 µm and preferably less than 250 µm. Most preferably, the maximum out-of-flatness should be less than 100 µm. Maximum out of flatness is measured using laser profilometry or using a drop gage. Out of flatness is the difference between the minimum and maximum heights on a surface.

When joining surfaces that are not lapped to make them flat and parallel, it is desirable to conform the ceramic joint material to the surfaces to be joined while the ceramic joint material is in the green state. Ceramics are typically loaded with polymeric materials in order to give them strength in the green state. Prior to removal of the polymeric materials it is possible to allow the green ceramic joint material to conform to the rigid surfaces of the material being joined. Preferably, the surfaces to be joined are flat and parallel. However the method of the invention is suitable for joining surfaces that are out-of-flat. The maximum degree of out-of-flatness is dictated by both the local and global conformity of the surfaces joined.

One way to control ductility of the green ceramic joint material is to add plasticizers or select binders that allow the green ceramic joint material to conform to the surfaces to be joined. Surfaces with global out-of-flatness of up to 250 µm over 25 mm have been joined successfully using this new joining technique. The green ceramic joint material must be thick enough to allow plastic flow in the plane parallel to the surfaces to be joined, called the x-y plane, in order to allow the joining tape to conform to both rigid surfaces. The green ceramic joint material must be thin enough to prevent x-y shrinkage from initiating cracking during sintering. Preferred thicknesses for the green joint material are on the order of 5 µm to 1 mm.

For some applications the joint is fully, or nearly fully, dense after joining. This is important for gas separation membranes where low leak rates are needed in order to obtain high purity. The acceptable leak rate is determined by the purity required and the gas production rate of the device. For applications where lower purities are acceptable, a small leak in the joint may be very acceptable. For other applications the joint does not need to be dense. The porosity in the joint is easily controlled by the joining temperature and pressure.

Prior to the joining step, the surfaces should be cleaned by firing, grit blasting, ultrasonic cleaning, or standard laboratory practices. No special treatment is necessary to roughen the surfaces and cleaning is only for the purpose of removing unwanted impurities which might be entrained in the part as part of the high-temperature joining process.

The joint material should be placed between the two joining surfaces of the sintered bodies to be joined. Aligning fixtures can be used, if necessary or desired. When using green ceramic tapes, it is very easy to shear the size gasket desired and used a solvent to attach the tape to the sintered ceramic by applying a thin coating of solvent to both surfaces of the tape prior to placing the gasket in the desired location on the sintered samples. The solvent tackifies the green tape so it lightly adheres to the surfaces to be joined.

Pressure should then be applied during the initial stages of heating in order to allow the binder to flow and the gasket to conform to the surfaces to be joined. The pressure should be at least 10 kPa and preferably between 100 kPa and 700 kPa. The pressure should be less than 5 MPa and preferably less than 2 MPa. The purpose of the pressure is to plastically deform the joint material to the contour of the sintered joining surfaces, if needed, as well as keeping the joint material in contact with the sintered surfaces until bonding has occurred by the initiation of solid state sintering, and to enhance the sintering kinetics. Pressure can aid in densification at elevated temperatures and can be increased once necking has occurred, if desired. Alternatively, one can release or lower the pressure after necking, if increased pressure results in unwanted reaction between the sintered surfaces and the setter material or if the strength of the sintered ceramics decreases at elevated temperature. The pressure can be applied statically or can be controlled with a load cell or displacement gauge.

The increase in temperature should be dictated by knowledge of how the binder is removed from the polymer so as not to damage the joint material. Joining temperature is dependent on the thickness of the joint material, the width of the joint and the removal characteristics of the polymer in the green joint material. Since the sintered surfaces will often be sintered to a state of closed porosity, it is desirable to remove the binder in the x-y plane. Thermogravimetric analysis (TGA) coupled with differential thermal analysis (DTA) is the method most commonly used for tailoring a binder removal cycle. As is common with ceramic processing, the use of a vacuum or controlled atmosphere can be used to speed up binder removal with non-oxide ceramics and the control of partial pressure of oxygen or air flow can be used with oxide ceramics.

The joining temperature should not exceed the sintering temperature used to manufacture the sintered bodies being joined and is preferably below that sintering temperature. The reason for limiting the joining temperature is to control the grain size in the sintered bodies, since grain growth occurs at elevated temperatures and to limit the amount of creep deformation that could occur in the sintered bodies. For some applications, it is preferred to maintain the joining temperature at least 100° C. below the minimum sintering temperature (i.e., the lowest temperature at which at least one of the sintered bodies sinters) of the sintered bodies so that the grain size of the previously sintered ceramic does not change or to limit creep of the components being joined. Non-limiting exemplary joining temperatures range from 1100° C. for perovskites to 2100° C. for silicon carbide.

It is also possible to limit creep of the sintered bodies being joined by using spacers or packed powder beds to support the components susceptible to creep.

Joining time is less critical than joining temperature since diffusion is thermally activated and increases exponentially with temperature and only parabolically with time. Joining times should be dictated by the densification of the joint and can be monitored by dilatometry (shrinkage of the joint), post-sintering leak checking, or microscopy of the polished or fractured cross-sectioned joint. Preferred joining times range from 1 minute to 10 hours and are more preferably from 1 hour to 5 hours.

Joining in accordance with the inventive method can be conducted in multiple steps or in a single step. Multiple steps may be more efficient due to use of furnaces or reaction with setters. A slower, first, joining cycle can be used in a first furnace in order to remove the binder and neck the particles together under an applied pressure and a second joining cycle and furnace can be used for final sintering with reduced or no external pressure. In order to avoid setter interaction, it may be advantageous to use reduced pressure or no applied pressure at sintering temperatures. Setters are materials in the furnace with which the sintered bodies to be joined are in contact. The specific joining conditions can be tailored to the ceramic to be joined.

It is possible to grade the composition of the joint when joining dissimilar materials or using joining tapes with different green properties to control the degree of flow in the tapes. Furthermore, it is possible to put the joint in compression or tension by controlling the thermal expansion of the joint. Assuming a biaxial stress state and looking at a sandwich structure in which two plates of thickness $t_1$ are joined to with a ceramic of thickness $t_2$ after joining, the residual stress in the joint after firing, $\sigma_2$, is given by:

$$\sigma_2 = 2\Delta T \Delta \alpha E_1 E_2 t_1 / (2E_1 t_1 (1-\nu_1) + E_2 t_2 (1-\nu_2))$$

where $\Delta T$ is the temperature range over which stresses are set up, $\Delta \alpha$ is the mismatch in thermal expansion between the joint material and the previously sintered ceramic to be joined, E is Young's modulus, t is thickness, $\nu$ is Poisson's ratio, and the subscripts 1 and 2 refer to the sintered bodies to be joined and sintered joint material, respectively. The residual stress in the previously sintered ceramic after joining, $\sigma_1$, is given by:

$$\sigma_1 = -t_2 \sigma h d \, 2/2t_1.$$

When a thin joined region is adjacent to a thicker unjoined region it may be advantageous to put the joint in compression with a slight residual tensile stress in the thicker previously sintered regions. This can easily be accomplished by making $\Delta \alpha$ negative (the joined region having a lower coefficient of thermal expansion than the previously sintered region). The degree of compression is controlled by the thickness of the joint and tailoring the composition of the joint material. For example, if two zirconia parts are to be joined, it is possible to lower the thermal expansion of the solid state sintered zirconia joint by adding alumina to the zirconia to make an alumina-zirconia composite.

The invention shall be further illustrated and the objects and advantages thereof will be more clearly understood by reference to the following examples, which are given for illustration purposes only and are not intended to limit the scope of the invention.

EXAMPLES

Example 1

Joining Stoichiometric $La_{0.9}Ca_{0.1}FeO_{3-d}$ Sintered Bodies

Two hundred and fifty (250.0) grams of $La_{0.9}Ca_{0.1}FeO_3$ powder (Ceramatec lot 110-2 m²/g) with a surface area of 2.0 m²/g were added to a one liter high-density polyethylene (HDPE) jar with 250 grams yttria partially-stabilized tetragonal polycrystalline zirconia (Y-TZP) spherical media, 72.8 grams reagent-grade toluene, 18.2 grams denatured ethanol (Synasol PM-509 from Ashland Chemical), and 1.25 grams polyvinyl butyral (PVB) dispersant (grade B-79 from Solutia). The slurry was put on a paint shaker for 30 minutes to disperse the ceramic powder. Plasticizer (9.64 grams grade S-160 butyl benzyl phthalate (BBP) from Ferro) and binder (18.04 grams B-98 PVB from Solutia) were added and the slip put back on the paint shaker for one hour to dissolve the binder. The slip was then mixed for 16 hours on a ball mill before filtering, de-airing, and casting with a doctor blade on a polyester sheet to make a green ceramic joining tape with a thickness of 250±25 µm after drying. The dried tape had a solids content of 60 vol. % with a ratio of binder to plasticizer of 2.0 on a mass basis.

Ring shaped gaskets (9.5 mm i.d. by 15.8 mm o.d.) were sheared from the green joining tape. A gasket was used to join a ground $La_{0.9}Ca_{0.1}FeO_{3-d}$ disk to a ground $La_{0.9}Ca_{0.1}FeO_{3-d}$ ring. A disk was 21 mm o.d. by 2-3 mm thick. A ring was 21 mm o.d. by 2-3 mm thick with a 5 mm i.d. center hole. The >95% of theoretical density rings and disks were made by sintering tape cast parts at 1450° C. for 2 hours. The joining surfaces of the disk and ring were ground flat. Three disk to ring joining couples were made. The gaskets were solvent-bonded by roll-coating with a thin layer (1-3 milligrams terpineol/cm² green tape surface area) of α-terpineol (JT Baker Practical Grade of mixed isomers) to the joining surfaces of the $La_{0.9}Ca_{0.1}FeO_{3-d}$ risks and rings. The three couples were heated with 290 kPa pressure applied to the couple in a direction normal to the joining surface and with air flow (1-2 liters/minute) in a furnace at 5° C./hr from 20-150° C., 1° C./hr from 250-350° C., and 50° C./hr from 350-1250° C. (with a 4-hour hold at 1250° C.), and then cooled at 50° C./hr from 1250° C. to 20° C. The joined parts were leak checked before cross-sectioning and polishing.

The leak rate for each couple was measured at room temperature by connecting the 5 mm hole on the ring of each couple to a vacuum source, keeping the exterior of each couple at atmospheric pressure, establishing a pressure of <7000 kPa at that hole, and measuring the flow rate of gas exiting the couple through the 5 mm hole. The average leak rate for the three couples was 0.11±0.07 standard cubic centimeters/minute (sccm) at room temperature, demonstrating that the claimed invention produces joints with very low leak rates. FIG. 1 is a scanning electron micrograph (SEM) showing a polished cross-section of a joined region of Example 1 after heating to 1250° C. for four hours. The slot on the left shows the width of the joined region. FIG. 1 demonstrates that the claimed invention produces joints with good mechanical integrity.

Examples 2-5

Effect of Ceramic Powder Surface Area and Tape Plasticity on Leak Rate

Some perovskite ceramics sinter more readily when they are B-site rich (or A-site deficient). In order to increase the sintering rate of the joining tape in Example 1, one weight percent iron oxide was added to the $La_{0.9}Ca_{0.1}FeO_{3-d}$ powder used for the ng tape of Example 1. Table 1 shows the compositions, which were made in an ical manner to Example 1 except that $Fe_2O_3$ (Cerac grade 1-1039) was added during ispersing step and one kg of Y-TZP was used instead of 250 grams of media.

TABLE 1

Slip Compositions for Examples 2–5.

| Example | Binder/ Plasticizer | Ceramic | Fe$_2$O$_3$ | Toluene | EtOH[a] | B-79[b] | B-98[c] | BBP[d] |
|---|---|---|---|---|---|---|---|---|
| 2 | 2.0 | 999.04[e] | 10.00 | 307.7 | 76.9 | 5.00 | 71.49 | 38.24 |
| 3 | 1.0 | 999.04[e] | 10.00 | 231.5 | 57.9 | 5.00 | 52.54 | 57.53 |
| 4 | 0.5 | 999.04[e] | 10.00 | 154.9 | 38.7 | 5.00 | 33.48 | 76.94 |
| 5 | 1.0 | 920.2[f] | 9.20 | 242.1 | 60.5 | 4.65 | 48.9 | 53.56 |

[a]Ethanol, PM-509
[b]Dispersant (B-79 PVB).
[c]Binder (B-98 PVB).
[d]Plasticizer (S-160 BBP).
[e]2.0 m$^2$/g La$_{0.9}$Ca$_{0.1}$FeO$_{3-d}$ powder.
[f]6.0 m$^2$/g (La$_{0.9}$Ca$_{0.1}$)$_{1.005}$FeO$_{3-d}$ powder Example 2-4 tapes (see Table 1) were sheared with a constant outer diameter of 25.4 mm, with inner diameters of 19.1 mm, 15.9 mm, or 9.5 mm. The longest width of these gaskets was 3.2 mm, 4.8 mm, or 7.9 mm, respectively, giving diffusion distances during binder removal of half of these widths. Each unsintered, monolayer gasket (approximately 250 μm thick) was placed between a La$_{0.9}$Ca$_{0.1}$FeO$_{3-d}$ disk and a La$_{0.9}$Ca$_{0.1}$FeO$_{3-d}$ ring with the disk and ring having the same dimensions and properties as the sintered rings and disks of Example 1. The >95% of theoretical density disks and rings were made by sintering tape cast parts at 1450° C. for 2 hours. The desire was to have constant pressure on all three widths and then use different heating rates during the critical region of binder removal (150-250° C.) to determine the effect of gasket width in relation to binder/plasticizer ratio (which is on a mass basis unless specified otherwise). Critical heating rates were doubled with each cycle (1° C./hr, 2° C./hr, 4° C./hr, and 8° C./hr). Pressure was applied to each joining couple in a direction normal to the sealing surfaces. The pressure, however, was not held constant and varied from 175 kPa for the 19.1 mm inside diameter gaskets to 240 kPa for the 9.5 mm inside diameter gaskets. In addition, there was a slight temperature gradient in the furnace, which resulted in wider gaskets having a higher temperature compared with narrower gaskets. Twenty-seven gaskets (three at each binder/plasticizer ratio and gasket width) were heated at a time, using a firing cycle of 5° C./hr from 20-150° C., variable heating rate from 150-250° C., 5° C./hr from 250-350° C., 50° C./hr from 350-1250° C. (4 hour hold at 1250° C.), and 50° C./hr from1250-20° C. All sintered samples were leak checked in the same manner as the couples of Example 1 and selected samples were cross-sectioned and polished for SEM evaluation. One joining cycle was made comparing 6 m$^2$/g (Example 5) to 2 m$^2$/g (Example 3) using 360 kPa pressure and 5° C./hr from 20-350° C., 50° C./hr from 350-1250° C. (4 hour hold at 1250° C.), and 1250-20° C. at 50° C./hr.

Figure 2A:
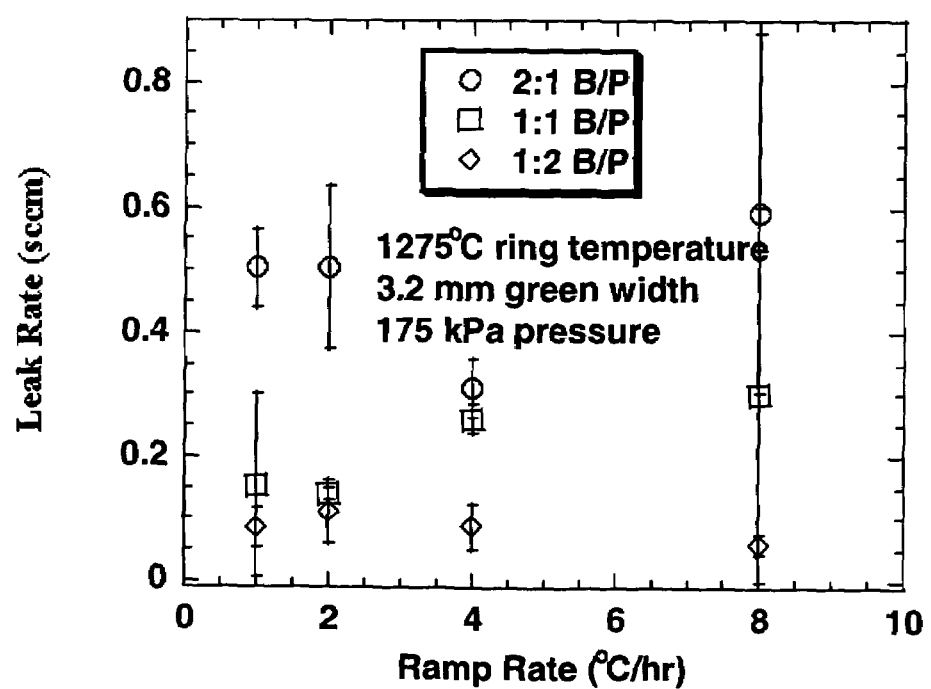
FIGS. 2(a), 2(b) and 2(c) are graphs of leak rate as a function of ramp rate between 150 and 250° C.
Figure 2B:
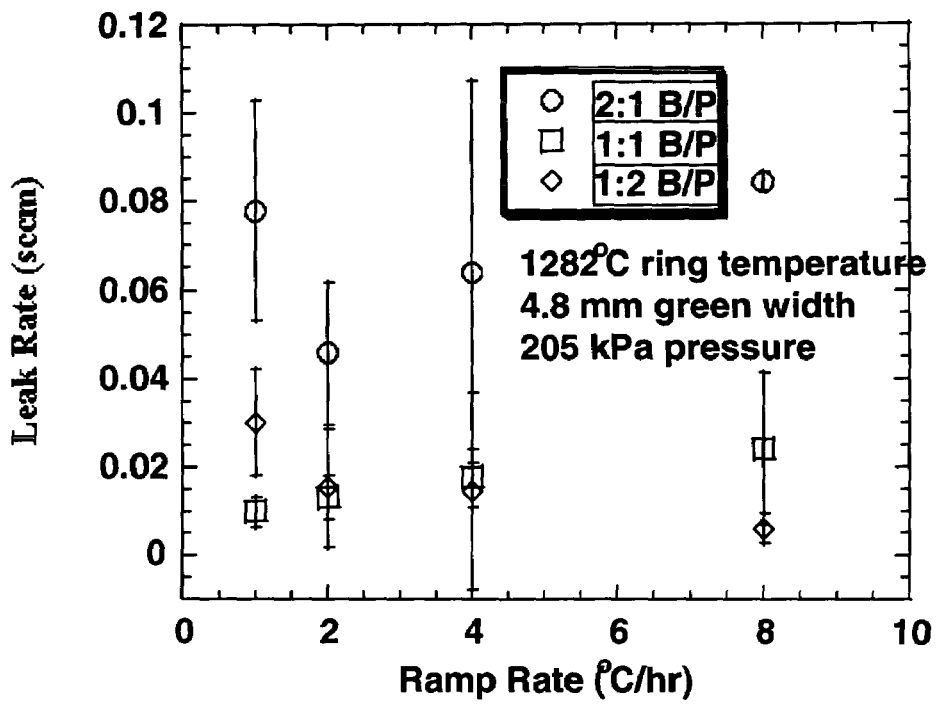
Figure 2C:
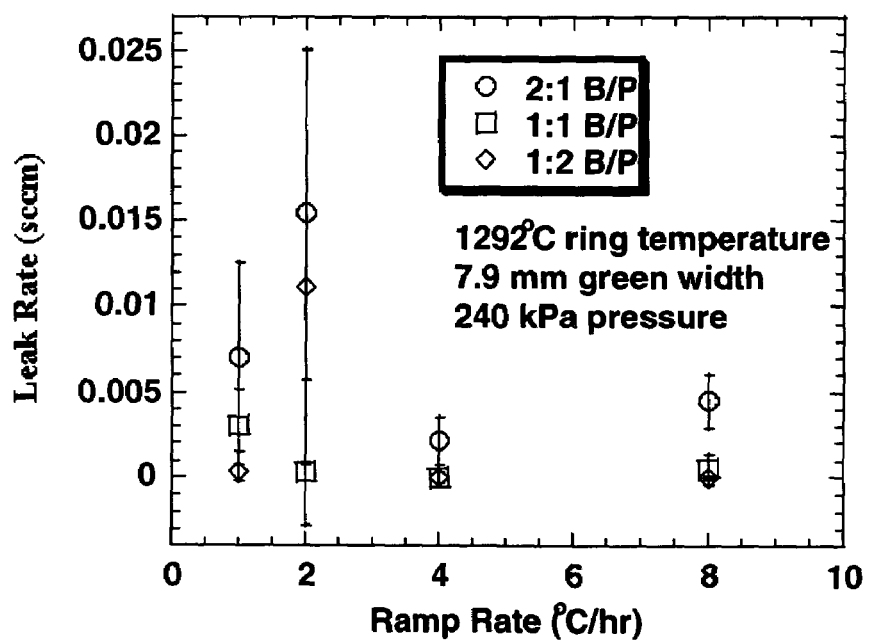

FIGS. 2a, 2b and 2c show the results of the joining with 2 m$^2$/g tapes for (a) 3.2 mm wide gaskets loaded with 175 kPa pressure, (b) 4.8 mm wide gaskets loaded at 205 kPa pressure, and (c) 7.9 mm wide gaskets loaded at 240 kPa pressure. There was no effect of temperature ramp rate on leak rate, contrary to expectation. Higher plasticization of the gaskets (lower binder to plasticizer ratios (B/P)), resulted in lower leak rates, regardless of the gasket size. Increased pressure and joining temperature decreased leak rate. Wider gaskets had lower leak rates than thinner gaskets, but this was due to higher pressure and temperature on these gaskets.

Figure 3A:
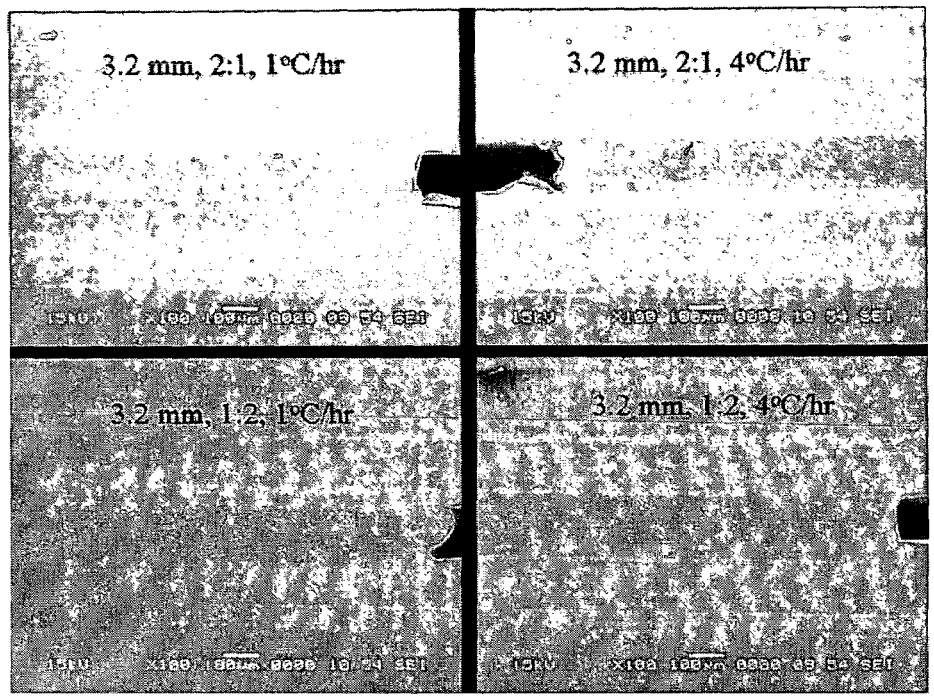
FIGS. 3(a), 3(b) and 3(c) are micrographs of polished cross-sections showing joined regions.
Figure 3B:
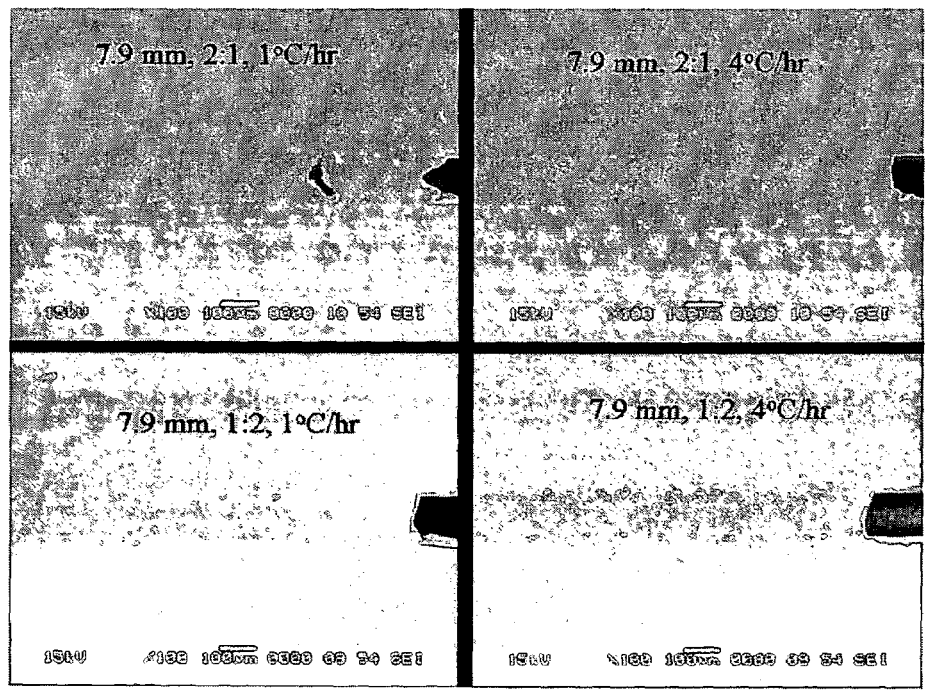
Figure 3C:
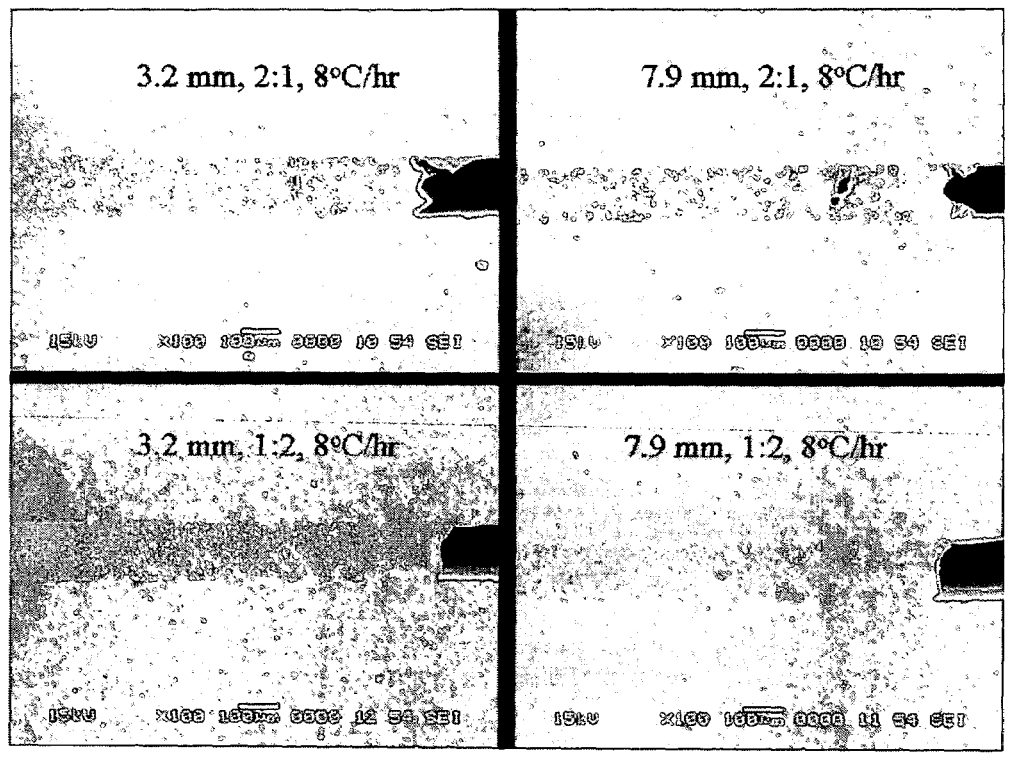

FIGS. 3(a), 3(b) and 3(c) show joined regions in polished cross-sections for (a) 3.2 mm gaskets of La$_{0.9}$Ca$_{0.1}$FeO$_{3-d}$ joined at heating rates of either 1 or 4° C./hr, (b) 7.9 mm gaskets of La$_{0.9}$Ca$_{0.1}$FeO$_{3-d}$ joined at heating rates of either 1 or 4° C./hr, and (c) selected samples heated at 8° C./hr. There was relatively low flow in these tapes even though the pressures were high (175 kPa for 3.2 mm gaskets and 240 kPa for 7.9 mm gaskets).

Figure 4:
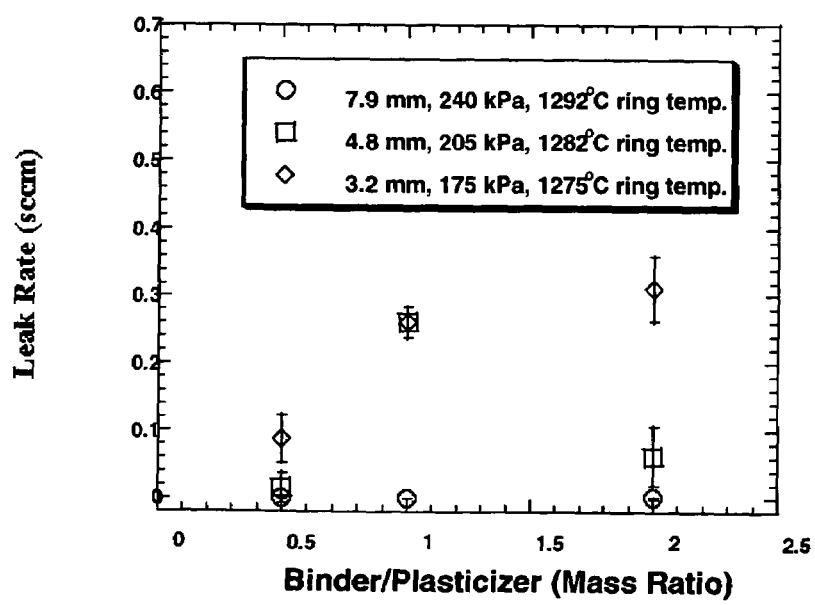
FIG. 4 is a graph of leak rate as a function of binder/plasticizer content for tapes made with 2 m$^2$/g La$_{0.9}$Ca$_{0.1}$FeO$_{3-d}$ powder.

FIG. 4 shows leak rate as a function of binder/plasticizer content for tapes made with 2 m$^2$/g La$_{0.9}$Ca$_{0.1}$FeO$_{3-d}$ powder. Regardless of the pressure applied, more plasticized tapes resulted in lower leak rates.

Despite the fact that a more plasticized gasket resulted in lower leak rates (see FIG. 4), there was very little difference in the degree of deformity of the gaskets (see FIG. 3). This suggests that the ability to optimize a given tape composition for joining purposes is dependent on the surface area, organic content, and the degree of plasticization.

Table 2 gives leak rates for the comparative gaskets, indicating that there is no downside to using the higher surface area tape on ground surfaces when the joining pressure is 360 kPa. The leak rates are acceptable for both joining tapes.

TABLE 2

Leak Rates for Seals Heated at 5° C./hr During Binder Removal.

| Example | Surface Area of Powder (m$^2$/g) | Leak Rate (sccm) |
|---|---|---|
| 5 | 6 | 0.00055 ± 0.0014 (5 out of 6 hermetic) |
| 3 | 2 | 0.00092 ± 0.0011 (3 out of 6 hermetic) |

One hundred and eleven joints were made without any evidence of large leak rates. Low-temperature binder removal did not cause cracking of the joint when confining pressure (175-360 kPa) was used on ground surfaces.

Examples 6-8

Effect of Tape Stoichiometry on Leak Rate

The three tapes shown in Table 3 were made in a manner similar to that described in Examples 2-5 except that both the composition of the ceramic and the additives (iron oxide and calcium carbonate (GE grade 111-30-26)) were varied to produce joining tapes that were B-site rich, near-stoichiometric, and A-site rich after joining. Three tapes were made by adding the ingredients shown in Table 3 to 155.1 grams toluene, 38.8 grams ethanol (PM 509), 5 grams PVB dispersant (B-79), and 77.0 grams BBP plasticizer (Santicizer 160), which were previously added to a one-liter HDPE bottles containing one kilogram 15 mm diameter Y-TZP media. The slips were milled for two hours, in thirty minute increments (with cooling in between to avoid overheating the jars) on a paint shaker in order to reduce the particle size of the $Fe_2O_3$. The binder (33.5 grams of B-98 PVB) was then added and the slips were put on the paint shaker for an additional hour before rolling overnight on the ball mill.

The slips were deaired and cast to make 250 μm thick tapes. Bilayer tapes were then made by laminating 2 green tapes together. The bilayer tapes were joined to ground $La_{0.9}Ca_{0.1}FeO_{3-d}$ joining samples in a manner similar to Examples 2-5. The joining couples of Examples 6-8 consisted of a first 10.6 cm long by 3.8 cm wide by 0.05 cm thick rectangular plate and a second rectangular plate of the same outer dimensions but with two 3.7 cm by 1.83 cm rectangular through-holes, the holes separated by 0.36 cm. The bilayer tape was cut to the same dimensions as the plate with the rectangular holes to form gaskets. A gasket was placed between the two rectangular plates of each joining couple. External pressure (275 kPa) was applied normal to the sealing surfaces of each sealing couple and three couples of each type were joined by heating in a furnace as follows: 5° C./hr from 20-350° C., 50° C./hr from 350-1100° C. (four hour hold at 1100° C.), and 50° C./hr from 1100-20° C. The 1100° C. hold was below the eutectic in the $CaO—Fe_2O_3$ pseudobinary system, which occurs at approximately 1215° C. Therefore the seal is made at a temperature where no liquid phase forms. The couples were leak checked, cross-sectioned and viewed on the SEM. Each couple contains two ports so a total of 6 ports were leak checked. The leak rate of each port was measured by connecting the port to a vacuum source, reducing the pressure at the port to <7000 kPa and measuring the flow rate exiting the port. The parts were reheated to 1200° C. for two hours without external pressure (60° C./hr ramps up and down) and a new cross-section was taken after leak checking. Finally, the parts were heated to 1300° C. for four hours and cross-sectioned a third time.

TABLE 3

Compositions of Examples 6–8.

| Example | Description | A/B (molar ratio) | Ceramic | $Fe_2O_3$ | $CaCO_3$ |
|---|---|---|---|---|---|
| | | | Mass (g) | | |
| 6 | B-site Excess | 0.971 | 990.0 | 10.0 | 0.0 |
| 7 | Near stoichiometric | 0.994 | 980.0 | 10.0 | 10.0 |
| 8 | A-site Excess | 1.003 | 976.0 | 10.0 | 14.0 |

Figure 5A:
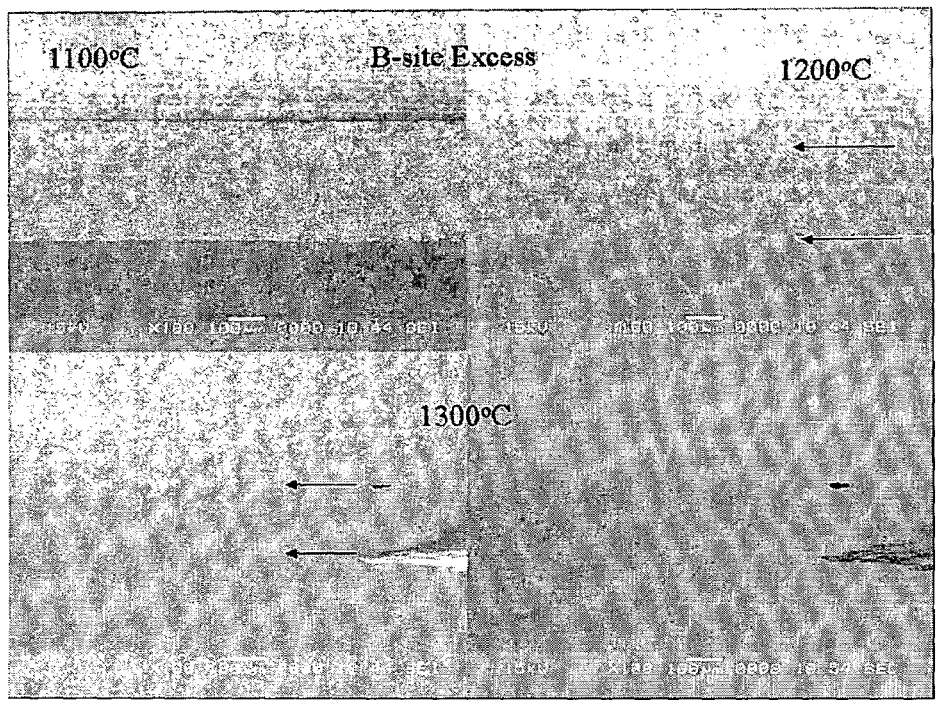
FIGS. 5(a), 5(b) and 5(c) are micrographs of polished cross-sections of joints as a function of joining or annealing temperature.
Figure 5B:
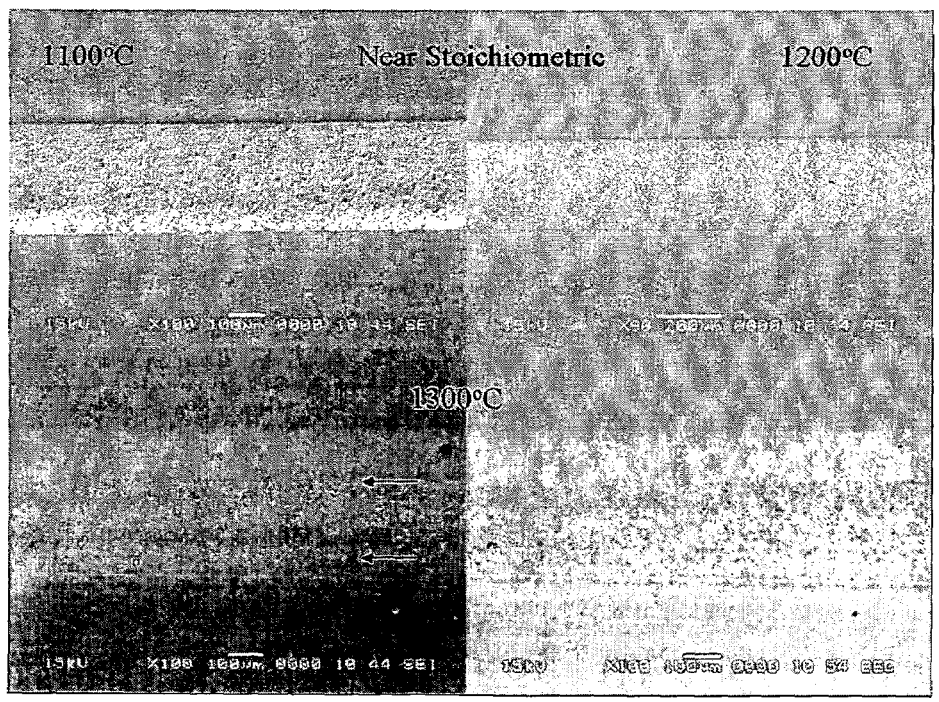
Figure 5C:
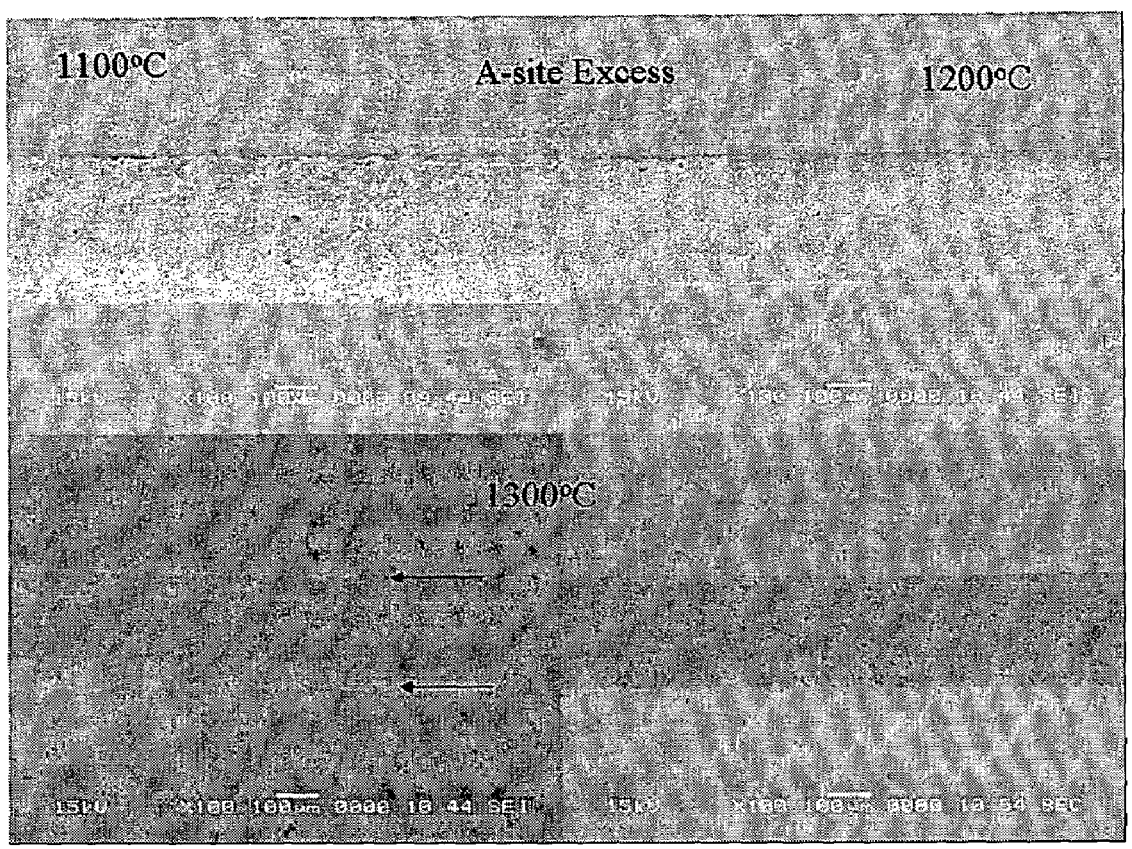
Figure 6:
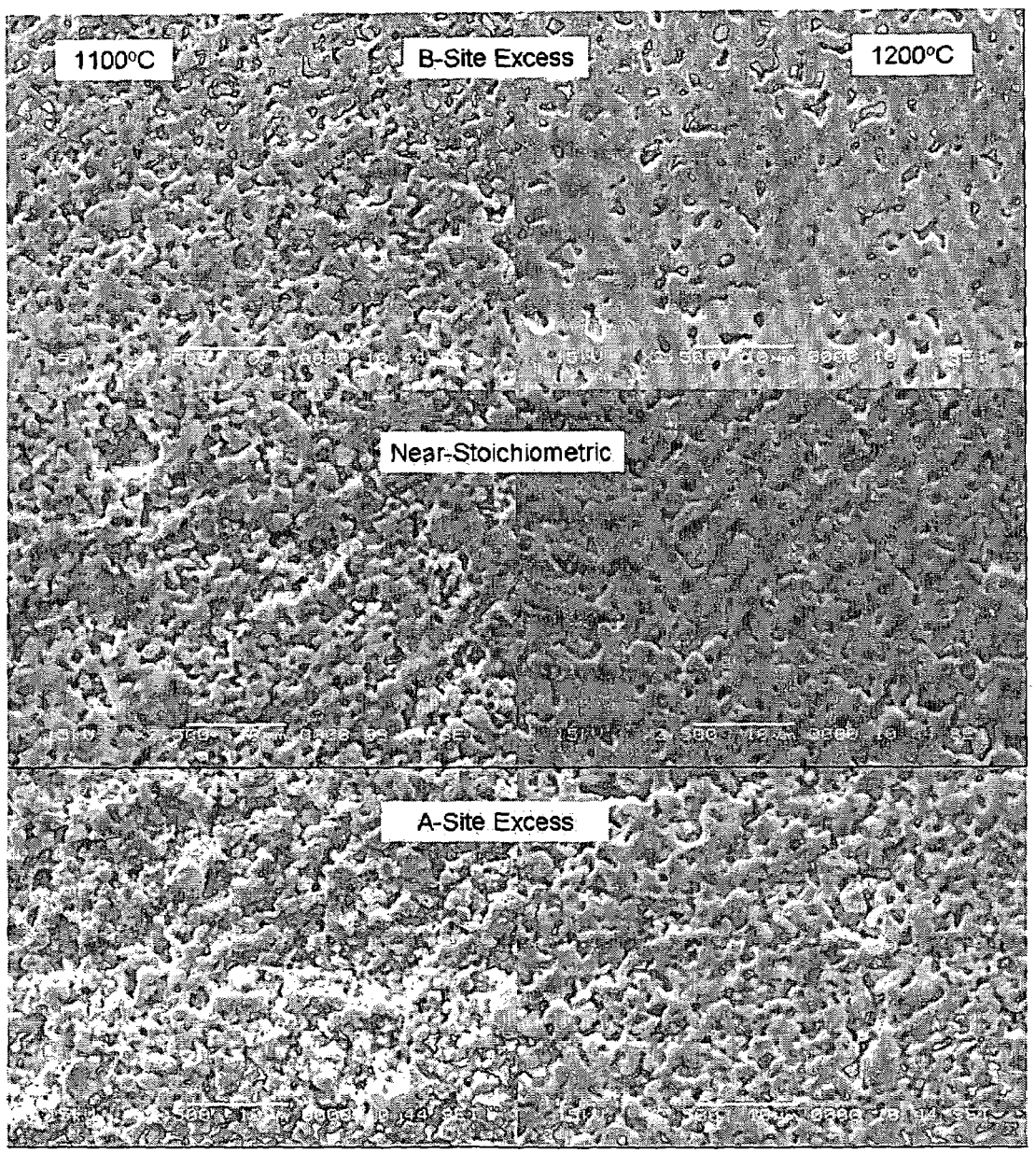
FIG. 6 shows micrographs of polished cross-sections of joints after joining at either 1100° C. with 330 kPa pressure (left) or annealing, without pressure, to 1200° C. (right)
Figure 7:
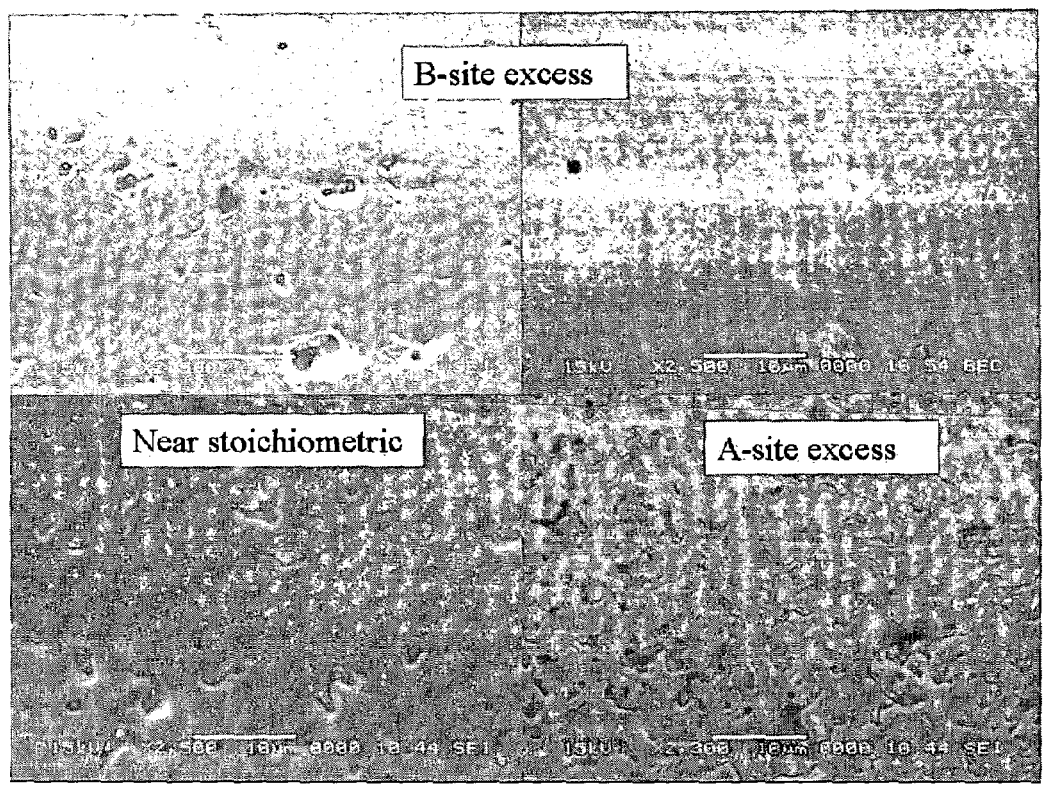
FIG. 7 shows micrographs of polished cross-sections of samples annealed at 1300° C. for four hours.

Table 4 gives the leak rate results and FIGS. 5-7 show the SEM micrographs. It is clear that the B-site excess provides enhanced sintering. However, there is no evidence that a liquid phase is present. This is consistent with the 1100° C. hold, which allows the additives to react rather than forming a transient liquid phase. The leak rates are acceptable after joining at 1100° C. for all three compositions and are further improved by heating to 1200° C. The decrease in leak rate with decreasing A/B ratio appears to be tied to the sintering activity of the perovskite powder. The B-site excess composition of Example 6 had an iron-rich secondary phase, whereas no secondary phases were noted in Examples 7 and 8.

FIGS. 5(a), 5(b) and 5(c) show polished cross-sections of joints as a function of joining or annealing temperature. FIG. 5(a) shows a B-site rich joint of Example 6 with secondary images on the left and back-scattered images on the right. There is z-direction sintering in joints as the porosity decreases. FIG. 5(b) shows a near-stoichiometric joint of Example 7, and FIG. 5(c) shows an A-site excess joint of Example 8. As in other Figs., arrows highlight joined regions.

FIG. 6 is a composite of micrographs showing polished cross-sections of joints after joining at either 1100° C. with 330 kPa pressure (left) or annealing, without pressure, to 1200° C. (right). Markers are all 10 μm long.

FIG. 7 shows that B-site excess parts have a lower porosity than A-site excess parts.

Example 9

Joining of Large Unground Component

Figure 8:
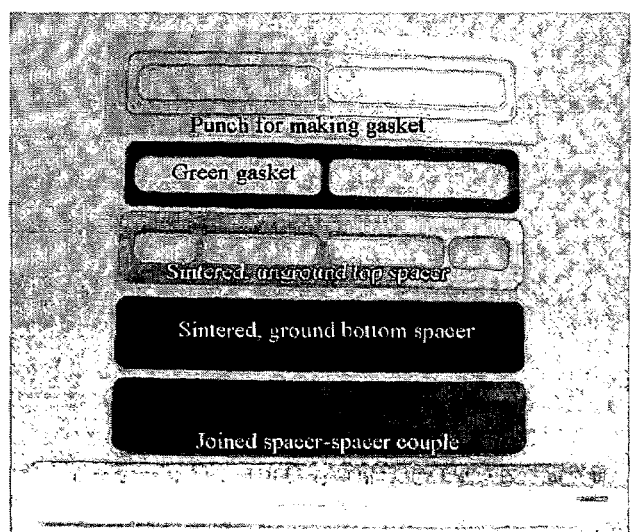
FIG. 8 is a photograph showing parts used in joining.

A large joining area (36.8 $cm^2$, as shown in FIG. 8) was joined with Example 6 tape cast at a green thickness of 430 μm. Bilayer tapes were solvent laminated together and then solvent bonded in between a ground $La_{0.9}Ca_{0.1}FeO_{3-d}$ bottom spacer and an unground $La_{0.9}Ca_{0.1}FeO_{3-d}$ top spacer, as shown in FIG. 8. Pressure (130 kPa) was applied normal to the joining surface with high-alumina refractory plates, with load transmitted through socket joints. Ground high alumina refractory plates were in contact with the $La_{0.9}Ca_{0.1}FeO_{3-d}$ spacers during the joining. The joining cycle was 5° C./hr from 20-350° C., 50° C./hr from 350-1150° C. (4 hour hold at 1150° C.), and 5°° C./hr from 1150-20° C. Each of the 2 ports on all three sintered couples was leak checked in the same manner as Example 1 by attaching the vacuum source to each port and measuring the flow of gas. All three couples were sent through a 1300° C. annealing cycle for four hours, without applied pressure (heating and cooling ramps were 1° C./minute), followed by leak checking of each of the ports.

The average leak rate of the 6 ports after joining at 1150° C. was 16.3±9.5 sccm, with the leak rate ranging between 7.9 and 34.6 sccm. After annealing, four of the six ports were hermetic. FIG. 9 shows a typical joined region, where it is

TABLE 4

Leak Rate Data for Examples 6–8 with Different A/B Ratios.

Figure 9A:
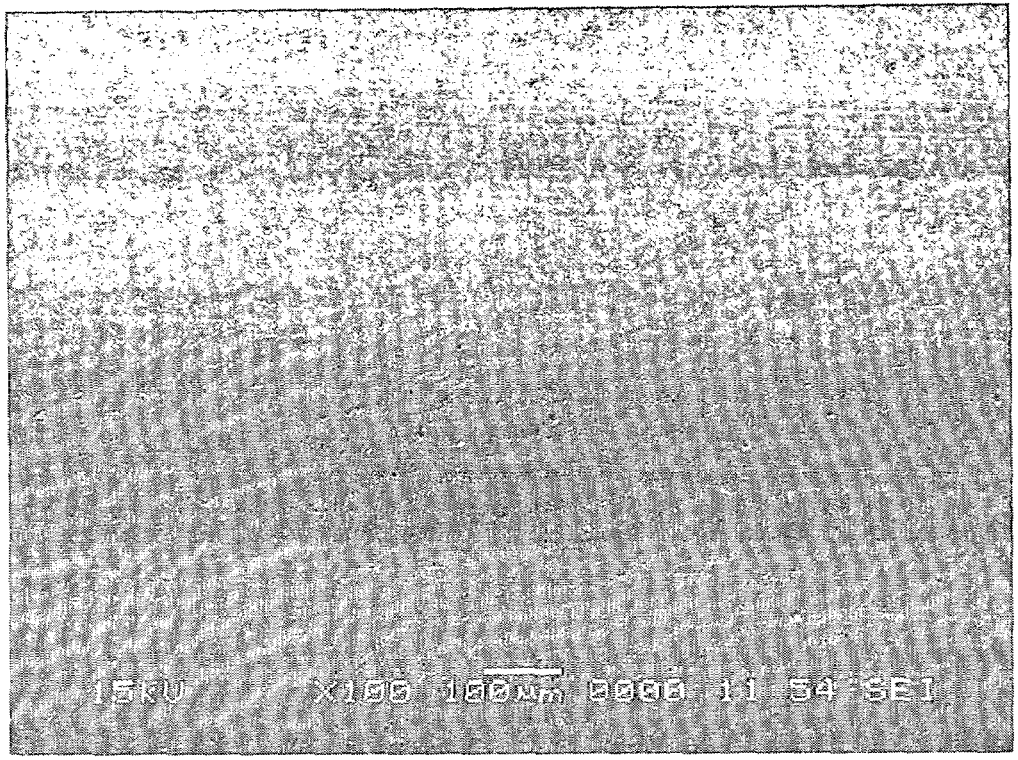
FIG. 9(a) is a secondary electron image (SEI) of polished cross-sections of a joined spacer-spacer couple showing excellent joints.
Figure 9B:
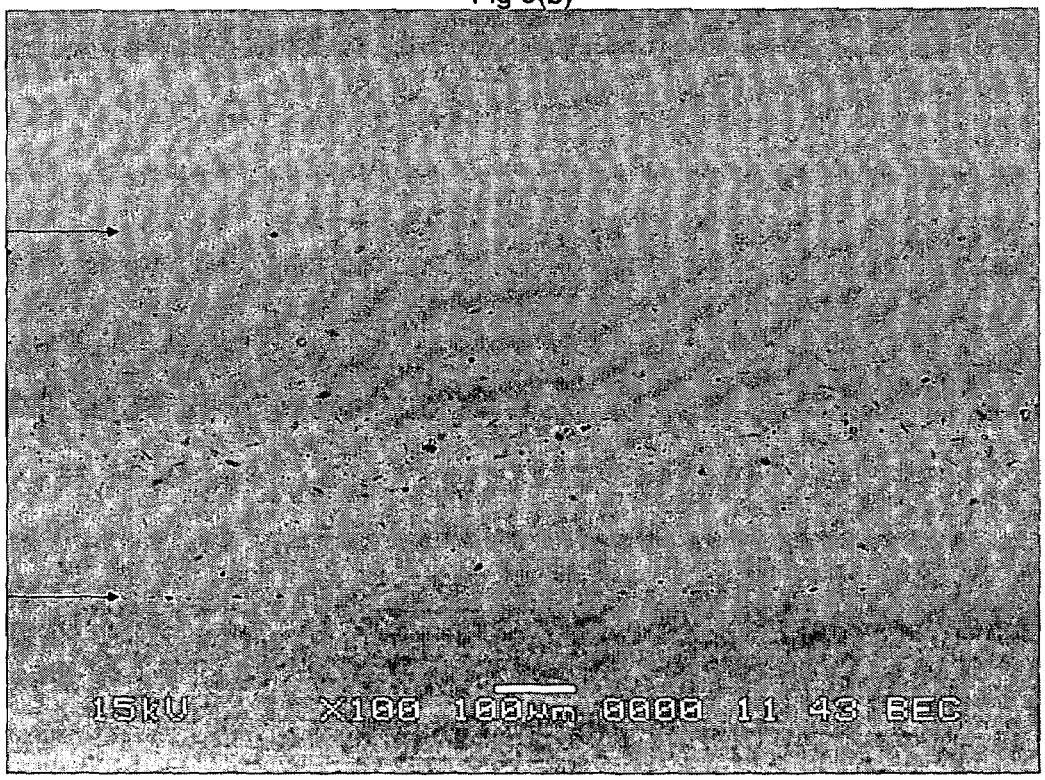
FIG. 9(b) is a backscattered electron image (BEI) of the cross-sections of FIG. 9(a) at 100× magnification.

| Example | Description | A/B (molar ratio) | Leak Rate (sccm) | | |
|---|---|---|---|---|---|
| | | | 1100° C. | 1200° C. | 1300° C. |
| 6 | B-site excess | 0.971 | 1.37 ± 0.12 | 0.05 ± 0.02 | Hermetic |
| 7 | Near stoichiometric | 0.994 | 1.58 ± 0.10 | 0.77 ± 0.16 | Hermetic |
| 8 | A-site excess | 1.003 | 1.81 ± 0.46 | 1.89 ± 0.50 | 0.95 ± 0.64 | difficult to see the joint in secondary imaging (FIG. 9(a)), but possible to distinguish it with back-scattered electrons (FIG. 9(b)). The joints are B-site rich, as evidenced by the secondary phase. The dark spots are pores or pullout (grinding marks go with the width of the paper and gray spots are an iron oxide rich secondary phase. Arrows in FIG. 9(b) show the joined region.

Example 10

Higher Pressure Joining

An identical sample to that joined in Example 9 was joined with higher pressure. The joining cycle initially had 690 kPa pressure applied as the temperature was ramped at 5° C./hr from 20-350° C. and 50° C./hr from 350-1100° C. The pressure was ramped to 965 kPa as the temperature was ramped to 1175° C. and held for four hours. The pressure was ramped down linearly as the temperature was ramped at 50° C./hr to room temperature. The leak rates on the two ports were 0.054 and 0.036 sccm, demonstrating that the invention produces joints with very low leak rates.

Examples 11-14

Effect of Powder Activity on Joining

A series of joining tapes comprising $La_{0.4}Sr_{0.6}Co_{1.01}O_{3-d}$ ceramic powder where the surface areas of the ceramic powder ranged between of 2.0 and 5.6 $m^2/g$ were made by the process described in Example 1, using the formulations shown in Table 5.

TABLE 5

Slip Compositions for Examples 11–14

| Example | Surface Area ($m^2/g$) | Mass (g) | | | | | |
|---|---|---|---|---|---|---|---|
| | | Ceramic[a] | Toluene | EtOH[b] | B-79[c] | B-98[d] | BBP[e] |
| 11 | 2.0 | 850.0 | 155.2 | 38.8 | 4.25 | 36.18 | 80.9 |
| 12 | 3.3 | 850.0 | 160.3 | 40.1 | 4.25 | 36.18 | 80.9 |
| 13 | 4.0 | 850.0 | 165.3 | 41.3 | 4.25 | 36.18 | 80.9 |
| 14 | 5.6 | 400.0 | 100.7 | 25.2 | 2.0 | 17.02 | 38.1 |

[a]$La_{0.4}Sr_{0.6}Co_{1.01}O_3$ powder
[b]Ethanol PM-509
[c]Dispersant (B-79 PVB)
[d]Binder (B-98 PVB)
[e]Plasticizer (S-160 BBP)

Figure 10:
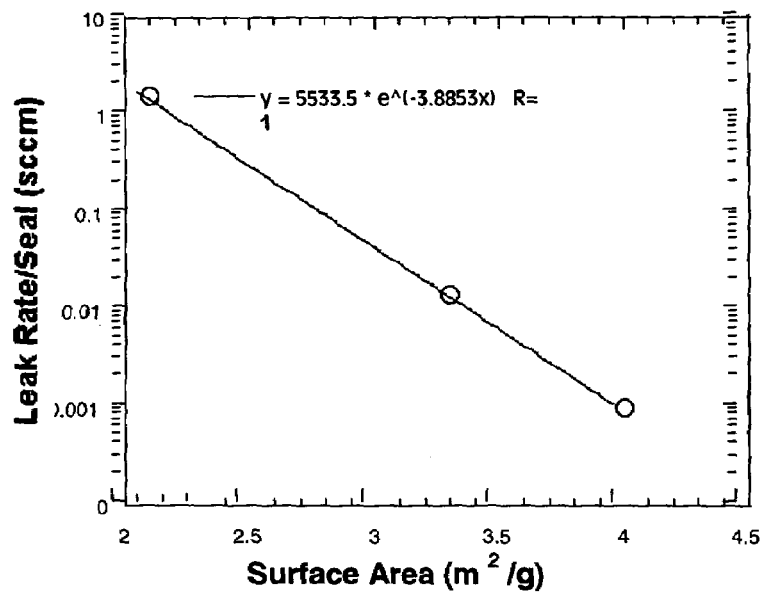
FIG. 10 is a graph of leak rate data for six-spacer (five seal) La$_{0.4}$Sr$_{0.6}$Co$_{1.01}$O$_{3-d}$ stacks heated to 1150° C. and held for two hours under 690 kPa pressure.
Figure 11:
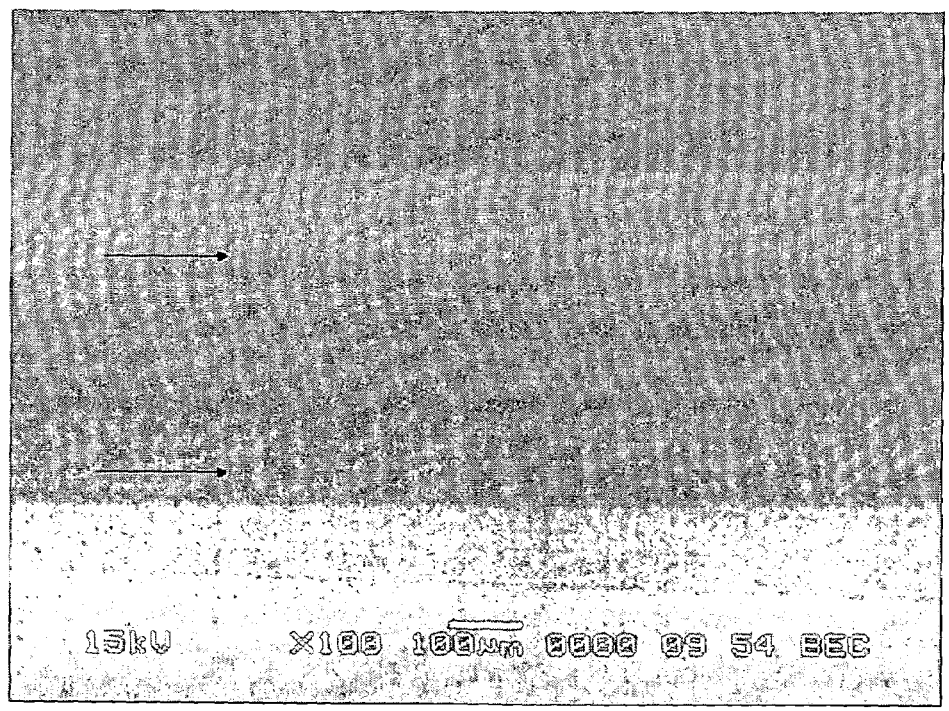
FIG. 11 is a BEI of a joint region made with tape containing 5.6 m$^2$/g ceramic powder at 690 kPa/1150° C./2 hr.
Figure 12:
FIG. 12 is a photograph showing six-spacer stacks before (middle) and after (ends) polishing to reveal seal area.

All four joining tapes were made with a binder/plasticizer content of 1:2 and with a solids content of 55.0 volume percent, as defined in Example 1. Bilayer or trilayer gaskets of the joining tapes were made by solvent bonding tapes together as described in sample 1. Gaskets (28.5 mm inner diameter with an outer diameter of 31.8 mm) were sheared and then solvent bonded to unground, sintered $La_{0.4}Sr_{0.6}Co_{1.01}O_{3-d}$ ceramic spacers. The dense spacers were prepared by sintering $La_{0.4}Sr_{0.6}Co_{1.01}O_{3-d}$ at 1250° C. The spacers had an outer diameter of 35.3 mm, an inner diameter of 27.5 mm and a thickness of 3 mm. The spacers were stacked six high, so that there were five joints in each stack. Each stack was loaded with 690 kPa normal to the joining surfaces and heated 5° C./hr from RT-350° C., 50° C./hr from 350-1150-1150° C. (2 hour hold at 1150° C.), and cooled 50° C./hr from 1150-600° C., 5° C./hr from 600-400° C., and 50° C./hr from 400° C.-RT. After joining and cooling to room temperature, the leak rate of each stack containing 5 ceramic to ceramic joints was measured in a manner similar to the method of Example 1. FIG. 10 shows the effect of ceramic surface area on leak rate at this temperature. The leak rate decreased exponentially with increasing powder surface area due to the increasing sintering rate of the ceramic powder with increasing surface area. FIG. 11 shows a back-scattered image of the joined region and FIG. 12 shows the visual appearance of the spacer stacks. Arrows mark the joint in FIG. 11, although the joint is difficult to see due to the excellent sintering.

Examples 15-16

Ability to Tailor Tape Properties

Three-layer gaskets were made where the outer layers of the tri-layer composite were stiff and the inner layer was deformable using tapes with properties as shown in Table 6. The stiff layer constrains the deformable inner layer during the initial stages of creep of the green tape as it conforms to the uneven surfaces of the unground spacers. Example 15 gaskets were produced using 2 $m^2/g$ tapes and Example 16 gaskets were produced using 4 $m^2/g$ tapes, where all three-layer gaskets used the 1:2 binder/plasticizer lower-solids tapes for the outer, conformable layers and the 2:1 binder/plasticizer higher-solids tapes for the stiffer, inner layer (see Table 6).

TABLE 6

| Tape Properties | | | | | | | |
|---|---|---|---|---|---|---|---|
| Solids Content (vol. %) | B/P | Surface Area ($m^2/g$) | Layer(s) | UTS (MPa) | Yield Stress (MPa) | % Elong. | E (MPa) |
| 55 | 1:2 | 2.0 | Outer | 1.9 ± 0.2 | 0.17 ± 0.02 | 28.2 ± 6.6 | 51 ± 16 |
| 65 | 2:1 | 2.0 | Inner | 9.1 ± 0.5 | 1.0 ± 0.1 | 16.6 ± 0.4 | 342 ± 100 |
| 50 | 1:2 | 4.0 | Outer | 3.1 ± 0.2 | 0.23 ± 0.02 | 22.0 ± 2.9 | 71 ± 9 |
| 60 | 2:1 | 4.0 | Inner | 13.7 ± 0.7 | 2.3 ± 0.5 | 12.5 ± 1.5 | 830 ± 87 |

Figure 13:
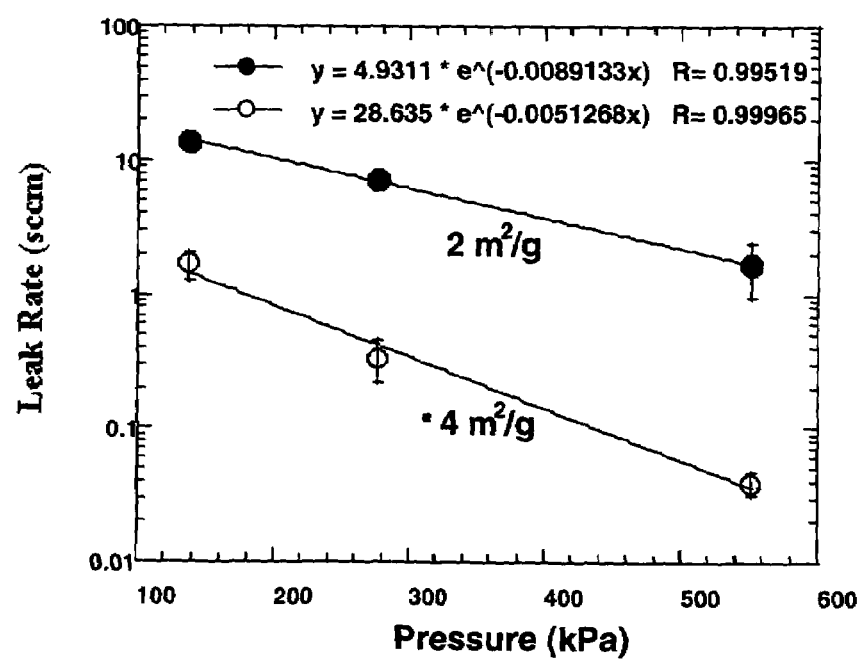
FIG. 13 is a graph of leak rates of unground spacer-spacer couples containing trilayer La$_{0.4}$Sr$_{0.6}$Co$_{1.01}$O$_{3-d}$ gaskets, which were joined at 1150° C. for 4 hours.

FIG. 13 shows how the leak rate of the joined unground spacer-spacer couples decreased with increasing pressure and sintering activity of the $La_{0.4}Sr_{0.6}Co_{1.01}O_{3-d}$ gaskets. While trilayer gaskets are not necessary to practice this joining technology, these examples illustrate the flexibility of the approach.

Examples 17 and 18

Joining with Non-Perovskite Compositions

To show the applicability of this technology to non-perovskite compositions, two tapes were fabricated. Example 17 was an $Al_2O_3$-15 vol. % $ZrO_2$ composition used to join alumina and Example 18 was a partially-stabilized $ZrO_2$ tape used to join zirconia. The Example 17 tape was prepared by adding one kg of Y-TZP media to a one liter HDPE jar and then adding 317.6 grams toluene, 79.4 grams ethanol (PM 509), 2.5 grams PVB (B-79), 397.0 grams alumina (Ceralox HPA 0.5), and 217.6 grams of partially stabilized zirconia (Daiichi HSY 3.0). The slip was put on the paint shaker for 30 minutes before adding 68.8 grams of binder (B-98 PVB),35.7 grams of plasticizer (S-160 BBP) and paint shaking for an additional hour. It was mixed for 68 hours on a ball mill before de-airing, and casting to make 250 μm thick tape.

Example 18 tape was prepared by adding 9 kg Y-TZP media to a 25 liter HDPE jar and then adding 3.03 kg toluene/methyl ethyl ketone and 60 grams of a polyester amine dispersant (Solsperse 24000 from Avecia) followed by 5.81 kg of $ZrO_2$ (3 mol. % $Y_2O_3$) powder (grade TZ-3Y from Tosoh). The slip was rolled for 4 hours and then 0.507 kg of PVB binder (B-79) and 0.423 kg of BBP plasticizer (S-160) were added and the slip rolled an additional 22 hours. The slip was filtered, de-aired, and cast to give a green thickness of 250 μm.

Bilayer gaskets were made by solvent bonding, as described in Example 1, to bond the green gaskets (28.5 mm inner diameter with an outer diameter of 31.8 mm) to the previously sintered ground ceramics. In the case of Example 17, the sintered ceramic was a 99.9% pure alumina and in the case of Example 18 it was a fully stabilized $ZrO_2$ (8 mol. % $Y_2O_3$) ceramic containing a small amount of alumina (Ceramatec grade TZ-102).

Figure 14:
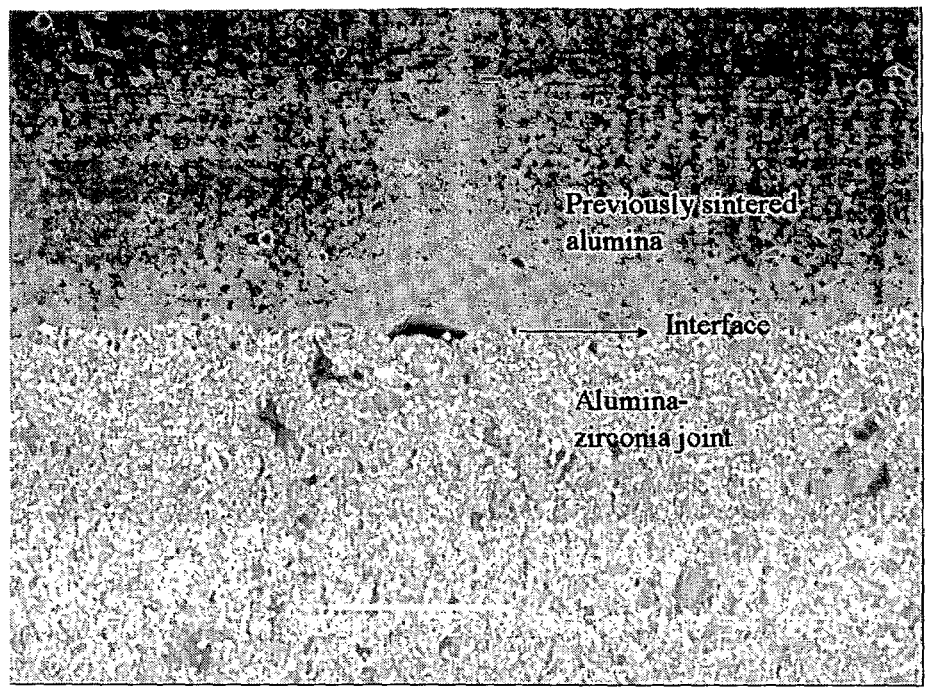
FIG. 14 is a micrograph showing a composite structure of Example 17, wherein the joining tape (Al$_2$O$_3$-15 vol. % Y-TZP) was put in a state of residual tension at room temperature by the surrounding alumina.
Figure 15:
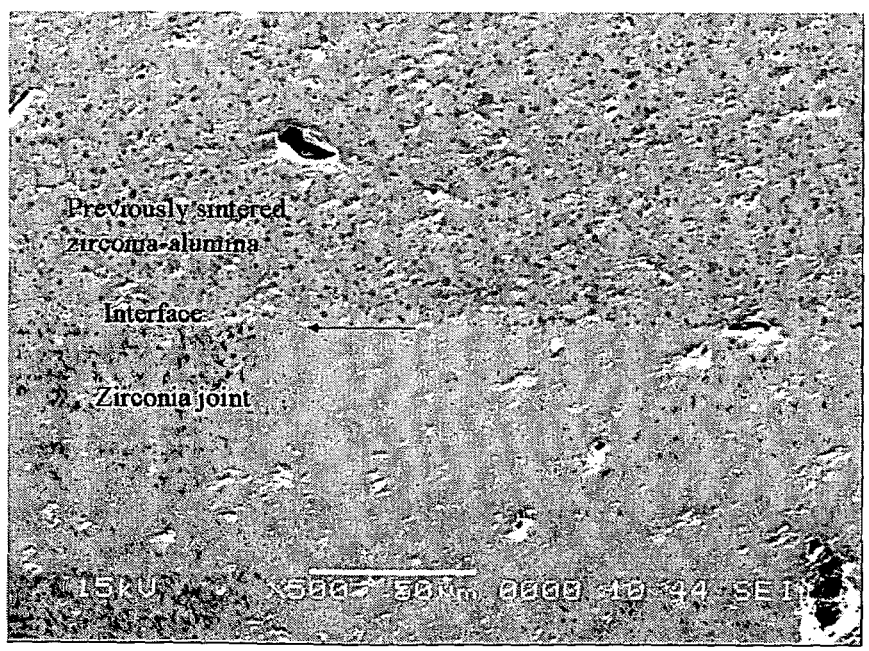
FIG. 15 is a micrograph showing a composite structure of Example 18, wherein the joining tape (Y-TZP) is in slight tension at room temperature by the surrounding previously sintered fully stabilized zirconia, which contains a small amount of alumina to limit grain growth.

The parts were loaded with 1.4 MPa pressure normal to the sealing surfaces and heated at 5° C./hr from 25-350° C. and then 50° C. from 350-1250° C. with a four-hour hold at 1250° C. The partially sintered joints were then cooled to room temperature at 50° C./hr. Example 17 parts were heated to 1600° C. and held for two hours without pressure, while Example 18 joints were heated to 1450° C. and held for two hours without pressure. The leak rate for Example 17 was 0.21 sccm and the leak rate of Example 18 was 0.07 sccm. FIGS. 14 and 15 show that excellent bonding between dissimilar materials was possible, demonstrating the applicability of this technique to joining a wide variety of ceramic materials.

While the invention has been described in detail and with reference to specific examples thereof, it will be apparent to one skilled in the art that various changes and modifications can be made therein without departing from the spirit and scope thereof.

The invention claimed is:

1. A method of joining at least two sintered bodies to form a composite structure, said method comprising:
    (a) providing a first sintered body comprising a first metallic oxide;
    (b) providing a second sintered body comprising a second metallic oxide;
    (c) providing a joint material between joining surfaces of the first sintered body and the second sintered body, wherein the joint material comprises at least one organic component and ceramic particles, wherein the at least one organic component comprises a polymeric component such that the joint material does not conform prior to heating and wherein the ceramic particles:
        (i) constitute at least 40 vol. % and not more than 75 vol. % of the joint material;
        (ii) comprise at least one element contained in at least one of the first sintered body and the second sintered body; and
        (iii) have a surface area ranging from 2 to 10 $m^2/g$;
    (d) applying a pressure to the joining surfaces of at least 1 kPa and less than 5 MPa to provide an assembly of the first sintered body, the second sintered body and the joint material;
    (e) heating the assembly to a conforming temperature sufficient to allow the joint material to conform to the joining surfaces; and
    (f) further heating the assembly to a joining temperature below a minimum sintering temperature of the first and second sintered bodies, whereby the at least two sintered bodies are joined by the joint material to form the composite structure, wherein the ceramic particles do not form a liquid phase during the method.

2. The method of claim 1, wherein the first metallic oxide is a first multicomponent metallic oxide having a first crystal structure selected from the group consisting of a perovskitic crystal structure and a fluoritic crystal structure, and the second metallic oxide is a second multicomponent metallic oxide having a second crystal structure identical to the first crystal structure.

3. The method of claim 2, wherein the first sintered body and the second sintered body have identical compositions.

4. The method of claim 1, wherein at least one of the first sintered body and the second sintered body comprises alumina, zirconia, ceria, a $La_{1-x}Sr_xCo_yO_{3-\delta}$ ceramic, wherein 1>x>0, 1.1>y>1 and δ makes the compound charge neutral, or a $(La_{1-x}Ca_x)FeO_{3-\delta}$ ceramic wherein 1>x>0.5, 1.1≧y≧1 and δ makes the compound charge neutral.

5. The method of claim 1, wherein the first and second sintered bodies are components of an ion transport membrane, an interconnect, a support, ceramic tubes, seals or conduits.

6. The method of claim 1, wherein the joint material is chemically and mechanically compatible with the first sintered body and the second sintered body.

7. The method of claim 1, wherein the at least one organic component is at least one component selected from the group consisting of a polymeric binder, a plasticizer, and a dispersant.

8. The method of claim 1, wherein the ceramic particles comprise all elements contained in at least one of the first sintered body and the second sintered body.

9. The method of claim 8, wherein the at least one organic component is at least one component selected from the group consisting of a polymeric binder, a plasticizer, and a dispersant.

10. The method of claim 1, wherein the at least one organic component comprises a binder and a plasticizer at a binder to plasticizer ratio of at least 0.25.

11. The method of claim 1, wherein the joining surfaces are provided such that an out of flatness of the joining surfaces is less than 500 μm.

12. The method of claim 1, wherein the conforming temperature is less than 300° C.

13. The method of claim 1, wherein the joining temperature is at least 100° less than the minimum sintering temperature of the first and second sintered bodies.

14. The method of claim 1, wherein the pressure is applied at an angle substantially normal to the joining surfaces.

15. The method of claim 1, wherein the composite structure is free of a distinguishable interfacial phase between the first sintered body and the second sintered body.

16. The method of claim 1, wherein the joint is stable through thermal cycling.

* * * * *